US012750909B2

(12) United States Patent
Wu

(10) Patent No.: US 12,750,909 B2
(45) Date of Patent: Sep. 29, 2026

(54) METHOD FOR HANDLING A MOBILITY MANAGEMENT STATE TRANSITION AFTER FALLBACK TO RRC ESTABLISHMENT

(71) Applicant: Google LLC, Mountain View, CA (US)

(72) Inventor: Chih-Hsiang Wu, Taoyuan (TW)

(73) Assignee: Google LLC, Mountain View, CA (US)

( * ) Notice: Subject to any disclaimer, the term of this patent is extended or adjusted under 35 U.S.C. 154(b) by 228 days.

(21) Appl. No.: 18/671,650

(22) Filed: May 22, 2024

(65) Prior Publication Data

US 2024/0314875 A1 Sep. 19, 2024

Related U.S. Application Data

(63) Continuation of application No. 17/274,650, filed as application No. PCT/US2019/059668 on Nov. 4, 2019, now abandoned.

(Continued)

(51) Int. Cl.

*H04W 76/19* (2018.01)
*H04W 76/25* (2018.01)
*H04W 76/27* (2018.01)

(52) U.S. Cl.

CPC ........... *H04W 76/19* (2018.02); *H04W 76/25* (2018.02); *H04W 76/27* (2018.02)

(58) Field of Classification Search

CPC ...... H04W 76/19; H04W 76/25; H04W 76/27

(Continued)

(56) References Cited

U.S. PATENT DOCUMENTS 8,792,891 B2 7/2014 Han et al.
9,692,567 B1 6/2017 Vaidya et al.

(Continued)

FOREIGN PATENT DOCUMENTS

BR 112019025619 A2 * 11/2020 ............ H04W 76/30
CN 109548136 A * 3/2019 .......... H04W 60/005

(Continued)

OTHER PUBLICATIONS

"3rd Generation Partnership Project; Technical Specification Group Core Network and Terminals; Non-Access-Stratum (NAS) Protocol for 5G System (5GS); Stage 3 (Release 15)", 3GPP TS 24.501 V15.1.0 (Sep. 2018), Sep. 2018, 23 pages.

(Continued)

*Primary Examiner* — Jean A Gelin
(74) *Attorney, Agent, or Firm* — Colby Nipper PLLC

(57) ABSTRACT

This document describes techniques and apparatuses for handling mobility management state transitions after fallback to radio resource control (RRC) establishment. In implementations, a user equipment UE transmits an RRC request to a network to initiate an RRC connection procedure. Afterward, the UE receives an RRC setup message from the network. The UE communicates, by an RRC protocol layer at the UE, an indication of the fallback to a fifth-generation mobility-management (5GMM) protocol layer at the UE. The UE then transitions the 5GMM protocol layer to a 5GMM idle state. In implementations, the UE then communicates, by the RRC protocol layer, an RRC connection-established indication to the 5GMM protocol layer, and transitions the 5GMM protocol layer to a 5GMM connected state to enable data transmission and reception with the network.

20 Claims, 11 Drawing Sheets

Related U.S. Application Data

(60) Provisional application No. 62/755,919, filed on Nov. 5, 2018.

(58) Field of Classification Search
USPC .......................................................... 370/328
See application file for complete search history.

(56) References Cited

U.S. PATENT DOCUMENTS

| | | | | |
|---|---|---|---|---|
| 10,187,910 | B2 | 1/2019 | Kim et al. | |
| 2006/0246883 | A1* | 11/2006 | Putcha | H04W 76/19 455/435.1 |
| 2008/0043771 | A1 | 2/2008 | Cho et al. | |
| 2009/0135775 | A1 | 5/2009 | Ou et al. | |
| 2009/0170426 | A1 | 7/2009 | Jung et al. | |
| 2011/0250880 | A1 | 10/2011 | Olsson | |
| 2012/0302239 | A1 | 11/2012 | Hu et al. | |
| 2013/0010705 | A1* | 1/2013 | Jonsson | H04W 28/0205 370/329 |
| 2014/0295825 | A1 | 10/2014 | Chuang et al. | |
| 2015/0031363 | A1 | 1/2015 | Kordybach et al. | |
| 2015/0065143 | A1 | 3/2015 | Hsu et al. | |
| 2015/0282241 | A1 | 10/2015 | Bergius et al. | |
| 2015/0282246 | A1 | 10/2015 | Teyeb et al. | |
| 2015/0304904 | A1 | 10/2015 | Li et al. | |
| 2016/0242049 | A1 | 8/2016 | Centonza et al. | |
| 2017/0086062 | A1* | 3/2017 | Chen | H04L 69/325 |
| 2017/0086109 | A1 | 3/2017 | Da Silva et al. | |
| 2017/0290072 | A1 | 10/2017 | Chen et al. | |
| 2017/0332431 | A1 | 11/2017 | Kim et al. | |
| 2017/0353902 | A1 | 12/2017 | Chen | |
| 2017/0374705 | A1 | 12/2017 | Mitsui et al. | |
| 2018/0092156 | A1 | 3/2018 | Kim et al. | |
| 2018/0213575 | A1 | 7/2018 | Chen | |
| 2018/0376524 | A1 | 12/2018 | Lee et al. | |
| 2019/0053034 | A1 | 2/2019 | Kim et al. | |
| 2019/0082350 | A1 | 3/2019 | Kim | |
| 2019/0116519 | A1 | 4/2019 | Park et al. | |
| 2019/0124714 | A1 | 4/2019 | Wang et al. | |
| 2019/0141776 | A1 | 5/2019 | Kim et al. | |
| 2019/0174449 | A1 | 6/2019 | Shan et al. | |
| 2019/0191483 | A1 | 6/2019 | Ryoo et al. | |
| 2019/0289571 | A1* | 9/2019 | Park | H04W 60/00 |
| 2019/0347295 | A1 | 11/2019 | Okuda et al. | |
| 2019/0357295 | A1 | 11/2019 | Kim et al. | |
| 2019/0394816 | A1 | 12/2019 | Kim | |
| 2020/0322777 | A1* | 10/2020 | Ryu | H04W 4/029 |
| 2021/0058972 | A1* | 2/2021 | Choe | H04W 12/043 |
| 2021/0345434 | A1 | 11/2021 | Wu | |
| 2021/0385727 | A1* | 12/2021 | Ohlsson | H04W 48/02 |
| 2024/0381207 | A1* | 11/2024 | Puneet | H04W 36/22 |

FOREIGN PATENT DOCUMENTS

| | | | | |
|---|---|---|---|---|
| CN | 110475380 B | * | 7/2024 | H04W 76/10 |
| EP | 4366403 A1 | * | 5/2024 | H04W 60/06 |
| WO | 2017171924 | | 10/2017 | |
| WO | 2020096963 | | 5/2020 | |

OTHER PUBLICATIONS

"ETSI TS 124 501 V15.3.0", 5G; Non-Access-Stratum (NAS) protocol for 5G System (5GS); Stage 3 (3GPP TS 24.501 version 15.3.0 Release 15), May 2019, 486 pages.

"Fallback Handling for RRC Inactive", 3GPP TSG-CT WG1 Meeting #112, West Palm Beach, FL (USA), 20924 Aug. 2018, Aug. 2018, 4 pages.

"Final Office Action", U.S. Appl. No. 17/274,650, filed Nov. 6, 2023, 16 pages.

"International Preliminary Report on Patentability", PCT Application No. PCT/US2019/059668, Feb. 5, 2021, 7 pages.

"International Search Report and Written Opinion", PCT Application No. PCT/US2019/059668, Apr. 15, 2020, 36 pages.

"LS on RRC Establishment Cause in RRC Reestablishment Fallback Case", 3GPP TSG RAN WG2 Meeting #103bis R2-1816013, Chengdu, China, Oct. 8-12, 2018, Oct. 2018, 2 pages.

"Meeting 5G Latency Requirements With Inactive State", Charting the Future of Innovation, #6, 2019, Jun. 2019, 11 pages.

"New Indication to Inform the Upper Layers for Reject in RRC_INACTIVE [L212}", 3GPP TSG-RAN WG2 Meeting #103, Gothenburg, Sweden, Aug. 20-24, 2018, Aug. 2018, 5 pages.

"Non-Access-Stratum (NAS) protocol for 5G System (5GS)", (3GPP TS 24.501 version 15.2.1 Release 15), Apr. 2019, 465 pages.

"Non-Final Office Action", U.S. Appl. No. 17/274,650, filed Aug. 2, 2023, 14 pages.

"Non-Final Office Action", U.S. Appl. No. 17/274,650, filed Mar. 8, 2024, 15 pages.

"Written Opinion", PCT Application No. PCT/US2019/059668, Oct. 21, 2020, 6 pages.

* cited by examiner

METHOD FOR HANDLING A MOBILITY MANAGEMENT STATE TRANSITION AFTER FALLBACK TO RRC ESTABLISHMENT

RELATED APPLICATIONS

This application is continuation of U.S. Utility application Ser. No. 17/274,650, filed Mar. 9, 2021, which is a national stage entry of International Application No. PCT/US2019/059668, filed Nov. 4, 2019, which claims the benefit of U.S. Provisional Application No. 62/755,919, filed Nov. 5, 2018, the disclosures which are incorporated herein by reference in their entireties.

BACKGROUND

A user equipment (UE), when operating in a radio resource control (RRC, radio-resource-control) connected (RRC_CONNECTED, radio-resource-control connected) state, communicates with a network, such as a radio access network. While in the RRC_CONNECTED state, the UE sometimes initiates an RRC connection reestablishment (radio-resource-control connection-reestablishment) procedure, such as in response to detecting a radio link failure of a master cell group (MCG), a re-configuration with sync failure of the MCG, a mobility from new radio (NR) failure, an integrity check failure indication from lower layers concerning a signaling radio bearer (SRB), an RRC connection reconfiguration failure, and so forth. Upon initiating the RRC connection reestablishment procedure, the UE transmits an RRC reestablishment request message (RRCReestablishmentRequest) to the network. If the network cannot provide an RRC reestablishment, the network may transmit an RRC setup message (RRCSetup) to the UE in response to the RRC reestablishment request message, thus commencing a fallback of an RRC connection, alternately referred to as fallback to RRC establishment.

A fallback to RRC establishment can occur in other situations. For example, a UE operating in an RRC inactive (RRC_INACTIVE) state can initiate an RRC connection resume (radio-resource-control connection-resume) procedure to resume a suspended RRC connection that includes resuming signal radio bearers (SRBs) and data radio bearers (DRBs), or to perform a Radio Access Network Notification Area (RNA) update. Upon initiating the RRC connection resume procedure, the UE transmits an RRC resume request (RRCResumeRequest) message to a network. If the network cannot provide an RRC resumption, the network may transmit an RRC setup message (RRCSetup) to the UE in response to the RRC resume request message, thus commencing a fallback to RRC establishment.

In some instances, the actions performed by the UE with regards to the fallback of the RRC connection are inefficient (e.g., experience data loss, include unnecessary processing steps). These inefficient actions can cause delays in communications between the UE and the network and/or result in unnecessary consumption of processing power.

SUMMARY

This document describes techniques and apparatuses for handling a mobility management state transition after fallback to radio resource control (RRC, radio-resource-control) establishment. These techniques include informing upper layers of a UE that a lower-layer failure is recovered to trigger the UE to transition to a fifth-generation system mobility management (5GMM)-connected state from a 5GMM-idle state. Additionally, after recovering the RRC connection, the upper layers are informed that user-plane resources are established to enable transmission and reception of user data.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of handling mobility management state transition after fallback to radio resource control (RRC, radio-resource-control) establishment are described below. The use of the same reference numbers in different instances in the description and the figures indicate similar elements.

DETAILED DESCRIPTION

Overview

Figure 1:
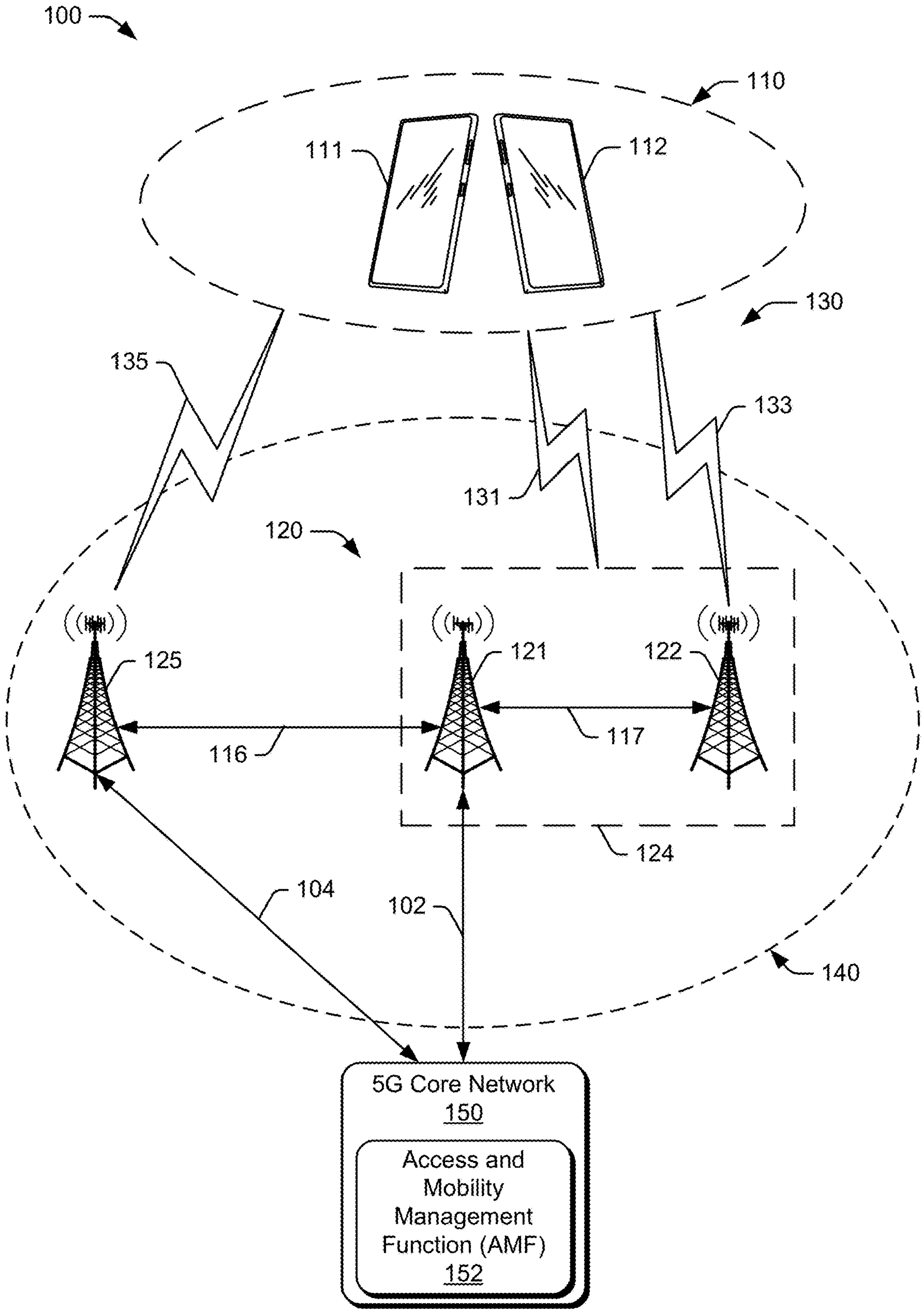
FIG. 1 illustrates an example operating environment in which aspects of handling mobility management state transition after fallback to RRC establishment can be implemented.

In conventional wireless communication systems, a user equipment (UE) communicates user data with a network when in a fifth-generation system mobility management (5GMM, fifth-generation mobility-management) connected (5GMM-connected) state and an RRC connected (RRC_CONNECTED) state. During this communication, the UE can initiate an RRC connection reestablishment procedure in response to a connection failure. Upon initiating the RRC connection reestablishment procedure, the UE transmits an RRC reestablishment request message to the network. If the network cannot reestablish the connection, the network sends an RRC setup message to the UE. Then, the UE performs actions specified in 3GPP TS 38.331. These actions include an RRC layer of the UE indicating, to a 5GMM layer of the UE, fallback of the RRC connection, and staying in the RRC_CONNECTED state in response to the RRC setup message. The 5GMM layer of the UE, in response to the indication of a fallback of the RRC connection, transitions to an 5GMM-idle state from the 5GMM-connected state, and initiates a service request procedure. In some cases, a service request message associated with initiating the service request procedure includes an uplink (UL) data status information element (IE) that indicates a protocol data unit (PDU) session(s) for which user-plane resources were active prior to receiving the fallback indication.

Subsequently, after receiving an RRC setup complete message (RRCSetupComplete) from the UE, the network transmits to the UE an RRC reconfiguration message (RRCReconfiguration) configuring a data radio bearer (DRB). According to these conventional systems, the UE does not transition back to the 5GMM-connected state after transitioning to the 5GMM-idle state in response to receiving the fallback indication. The UE in the 5GMM-idle state, therefore, does not transmit user data to the network or receive user data from the network even though the UE is in the RRC_CONNECTED state and configured with a data radio bearer (DRB). For example, the 5GMM layer indicates to a data service layer at the UE that a data connection is unavailable. In response, the data service layer enters an inactive state (data_inactive) and stops data transmission and reception.

In implementations, the UE starts a timer (e.g., Timer T3512) upon transitioning to the 5GMM-idle state from the 5GMM-connected state. However, the UE does not stop the timer because the UE does not transition back to the 5GMM-connected state. Consequently, the UE performs a periodic registration update upon expiry of the timer when the UE is in the RRC_CONNECTED state. This periodic registration update is not necessary, however, because the network and the UE are connected, thus obviating the need for the network to receive (while connected to the UE) the periodic registration update to determine the UE's location.

Similar problems arise in other scenarios, such as when a UE in a 5GMM-connected-with-RRC-inactive-indication state and an RRC inactive state initiates an RRC connection resume procedure to transmit user data. Upon initiating the RRC connection resume procedure, the UE transmits an RRC resume request message (RRCResumeRequest) to the network. If the network cannot resume the connection, the network may transmit an RRC setup message in response to the RRC resume request message. In response to the RRC setup message, the UE performs the same actions described above with respect to the fallback of the RRC connection. Consequently, the UE does not transition back to the 5GMM-connected state after transitioning to the 5GMM-idle state in response to receiving the fallback indication, which prevents the UE from transmitting data to the network or receiving data from the network even though the UE is in the RRC_CONNECTED state and configured with the DRB. In implementations, the UE (by way of a 5GMM protocol layer) initiates a timer (T3512) in response to transitioning to the 5GMM-idle state from the 5GMM-connected state. However, because the UE does not transition back to the 5GMM-connected state, the UE (by way of the 5GMM protocol layer) does not stop the timer. Because of the running timer, the UE performs unnecessary periodic registration updates.

In implementations, the operating state(s) of a UE can include mutually exclusive definitions or overlapping definitions. To illustrate, a UE operates in an RRC_CONNECTED state or an RRC_INACTIVE state when the UE has established an RRC connection to a network. Conversely, the UE operates in an RRC_IDLE state in scenarios where no RRC connection to the network has been established. In various implementations, the operating states include the following definitions:

RRC_IDLE: When a UE operates in an RRC_IDLE state, upper layers may configure a UE-specific discontinuous reception (DRX). Alternately or additionally, the UE controlled mobility can be based on a network configuration. Further, while operating in the RRC-IDLE state, various implementations of the UE monitor a Paging channel for control network (CN) paging using a 5G shortened temporary mobile subscriber identity (5G-S-TMSI), to perform neighbouring cell measurements and cell (re-)selection, and/or acquire system information (SI) and (if configured) send an SI request.

RRC_INACTIVE: When a UE operates in an RRC_INACTIVE state, a UE-specific DRX may be configured by upper layers or by an RRC protocol layer, and UE controlled mobility can be based on a network configuration. At times, when operating in the RRC_INACTIVE state, the UE stores the Access Stratum (AS) context and the RRC protocol layer configures a RAN-based notification area. Similar to the RRC_IDLE state, when operating in the RRC_INACTIVE state, the UE monitors a paging channel for CN paging using a 5G-S-TMSI, performs neighbouring cell measurements and cell (re-)selection, acquires SI, and (if configured), can send an SI request. In implementations, the UE operating in the RRC_INACTIVE state alternately or additionally monitors RAN paging using an Implicit Radio Network Temporary Identifier (I-RNTI), periodically performs RAN-based notification area updates, and performs RAN-based notification area updates when moving outside the configured RAN-based notification area.

RRC_CONNECTED: When operating in an RRC_CONNECTED state, a UE stores the AS context and supports transfer of unicast data to and/or from the UE. In some implementations, the UE may be configured with a UE-specific DRX at lower layers. For UEs supporting carrier aggregation (CA), various implementations of a UE operating in the RRC_CONNECTED state use of one or more Secondary Cells (SCells), aggregated with a Special Cell (SpCell), for increased bandwidth. For UEs supporting Dual Connectivity (DC), various implementations of a UE operating in the RRC_CONNECTED state use a Secondary Cell Group (SCG), aggregated with the Master Cell Group (MCG), for increased bandwidth. Further, the UE operating in the RRC_CONNECTED state supports network-controlled mobility within New Radio (NR) and to/from Evolved-Universal Terrestrial Access (E-UTRA). If configured, the UE monitors a paging channel. Alternately or additionally, the UE operating in the RRC_CONNECTED state monitors control channels associated with a shared data channel to determine if there is data scheduled for the UE, acquires SI, performs neighbouring cell measurements and measurement reporting, and/or provides channel quality and feedback information.

This document describes techniques and apparatuses for handling mobility management state transition after fallback to RRC establishment, which avoid leaving the 5GMM layer in the 5GMM-idle state and prevent the timer from running unnecessarily. In addition, these techniques allow upper layers of the UE to be informed when a lower-layer failure has been recovered. Accordingly, these techniques reduce data loss caused by the upper layer dropping user data received when in an inactive state, and also reduce communication delays introduced when the upper layers are not informed that the lower-layer failure has been recovered.

In aspects, a user equipment (UE) transmits a radio-resource-control request (RRC request) to a network to initiate a radio-resource-control connection procedure (RRC connection procedure). The UE receives, in response to transmitting the RRC request, a radio-resource-control setup message (RRC setup message) from the network. Afterward, the UE communicates, by a radio-resource-control protocol layer (RRC protocol layer) at the UE, an indication of the fallback to a fifth-generation mobility-management protocol layer (5GMM protocol layer) at the UE based on the receiving. The 5GMM protocol layer then transitions to a fifth-generation mobility-management idle state (5GMM-idle state). The UE communicates, by the RRC protocol layer, a radio-resource-control connection-established indication (RRC connection established indication) to the 5GMM protocol layer. At an arbitrary point in time later, the UE transitions the 5GMM protocol layer to a fifth-generation mobility-management connected state (5GMM-connected state) to enable data transmission and reception with the network.

In aspects, a user equipment (UE) transmits a request message to a network to reestablish an RRC connection based on a failure detected in the RRC connection. In response, the UE receives from the network a first RRC message to set up a new RRC connection, which triggers a fallback of the RRC connection. The UE then transitions to a fifth-generation system mobility management (5GMM)-idle state from a 5GMM-connected state. Subsequently, the UE transitions to the 5GMM-connected state from the 5GMM-idle state in response to an indication that the new RRC connection is established.

In aspects, a UE includes a processor and memory system coupled to the radio-frequency transceiver and configured to implement a protocol stack including an RRC layer and a 5GMM layer. The RRC layer is configured to initiate an RRC reestablishment procedure based on detection of a connection failure of an RRC connection with a network by transmitting a request message to the network via the radio-frequency transceiver to reestablish the RRC connection. The RRC layer is also configured to send a fallback message to the 5GMM layer that indicates a fallback of the RRC connection based on receiving an RRC message from the network to set up a new RRC connection. In addition, the RRC layer is configured to configure a data radio bearer and notify the 5GMM layer that user-plane resources are established in response to receiving a configuration message from the network. The 5GMM layer is configured to generate and send a 5GMM message to the RRC layer for transmission to the network when setting up the new RRC connection, the 5GMM message includes a service request message or a registration request message.

In aspects, a method for handling mobility management state transition after fallback to a Radio Resource Control (RRC, radio-resource-control) establishment is disclosed. The method includes a UE initiating an RRC connection resume procedure when the UE is in an RRC_INACTIVE state and a fifth-generation system mobility management (5GMM)-connected-with-RRC-inactive-indication state, the initiating including transmitting a request message to a network to resume the RRC connection. In addition, the method includes the UE receiving an RRC setup message from the network to set up a new RRC connection. The method also includes the UE transitioning to a 5GMM-idle state from the 5GMM-connected-with-RRC-inactive-indication state in response to a fallback triggered by the RRC setup message. Additionally, the method includes transitioning to a 5GMM-connected state from the 5GMM-idle state in response to an indication that the new RRC connection is established.

Example Environments

FIG. 1 illustrates an example wireless network environment 100 which includes a user equipment device 110 (UE 110) that communicates with a base station 120 that acts as a serving cell (serving base station 120) through one or more wireless communication links 130 (wireless link 130).

Although illustrated as a smartphone, the user equipment 110 may be implemented as any suitable computing or electronic device, such as a mobile communication device, computing device, client device, a modem, cellular phone, mobile phone, entertainment device, gaming device, mobile gaming console, personal media device, navigation device, media device, laptop computer, desktop computer, tablet computer, smart appliance, vehicle-based communication system, charging device, Advanced Driver Assistance System (ADAS), point-of-sale (POS) transaction system, health monitoring device, drone, camera, wearable smart-device, mobile-internet device (MID), Internet of Things (IoT) device, Fifth-generation New Radio user equipment, and the like.

A macrocell, microcell, small cell, picocell, and the like, or any combination thereof may implement the base station 120 (e.g., an Evolved Universal Terrestrial Radio Access Network Node B, E-UTRAN Node B, evolved Node B, eNodeB, eNB, Next Generation eNB, ng-eNB, Next Generation Node B, gNode B, gNB, or the like) a base station transceiver system, a Wireless Local Access Network (WLAN) router, a satellite, a terrestrial television broadcast tower, an access point, a peer-to-peer device, another smart phone acting as a base station, and so forth. In some cases, the base station 120 is a Next Generation Node B base station (gNB). A gNB may include a gNB base station Central Unit (gNB-CU) and one or more gNB base station Distributed Unit(s) (gNB-DU). In some cases, the gNB-CU is a logical node hosting Radio Resource Control (RRC, radio-resource-control) and Packet Data Convergence Protocol (PDCP) protocols of the gNB or RRC and PDCP protocols of an en-gNB that controls the operation of one or more gNB-DUs. In some cases, the gNB-CU is a logical unit with no physical unit (e.g., baseband processing unit, radio frequency (RF) chain, antenna). In a typical implementation, a gNB-DU connects to only one gNB-CU. In some cases, the use of "gNB Distributed Unit" and "gNB-DU" refer to a logical node hosting the Radio Link Control (RLC), Medium Access Control (MAC), and the Physical (PHY) layers of the gNB or en-gNB. The gNB-CU at least partially controls the operation of the gNB-DU.

The base station 120 communicates with the user equipment 110 (e.g., UE 111, UE 112) via the wireless link 130 (e.g., wireless link 131, wireless link 135). Any suitable type of wireless link may implement the wireless link 130. The wireless link 130 can include a downlink of data and control information communicated from the base station 120 to the user equipment 110, an uplink of other data and control information communicated from the user equipment 110 to the base station 120, or both. The wireless link 130 may include one or more wireless links or bearers implemented using any suitable communication protocol or standard, or combination of communication protocols or standards such as 3rd Generation Partnership Project Long-Term Evolution (3GPP LTE), Fifth-generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110. Additionally, multiple wireless links 130 may be configured for single-RAT dual connectivity or multi-RAT dual connectivity (MR-DC). Each of these various multiple-link situations tends to increase the power consumption of the UE 110.

In aspects, the user equipment 110 communicates with a base station 124 via a wireless link 131. In this aspect, the base station 124 may be a Next Generation Node B base station. In FIG. 1, the user equipment 110 can communicate with one or more base stations 124 (illustrated as base stations 121 and 122) through one or more wireless communication links 131, illustrated as wireless links 131 and 133.

As illustrated in FIG. 1, the user equipment 110 may communicate with base station 122 via a wireless link 133. The wireless link 133 may be implemented using the same communication protocol or communication standard, or a different communication protocol or communication standard, as the wireless link 130.

In aspects, the user equipment 110 may communicate with another base station 125 (neighbor base station 125) via a wireless link 135. The wireless link 135 may be implemented using the same communication protocol or communication standard, or a different communication protocol or communication standard, as the wireless link 130. The neighbor base station 125 may be a gNB base station.

The base stations 120 (e.g., the base station 124, the gNB 125, and any additional base stations (not illustrated for clarity)) are collectively a Radio Access Network 140 (RAN 140, Evolved Universal Terrestrial Radio Access Network 140, E-UTRAN 140, 5G NR RAN 140). RAN 140 connects via links (e.g., link 102, link 104) to a Fifth-generation Core network 150 (5GC 150) to form a wireless operator network.

The base stations 121 and 125 connect, at link 102 and link 104 respectively, to the 5GC 150 via an NG2 interface for control-plane signaling and via an NG3 interface for user-plane data communications. In addition to connections to core networks, base stations 120 may communicate with each other. For instance, the base station 124 (e.g., base station 121) and the neighbor base station 125 can communicate using an Xn Application Protocol (XnAP), at 116, to exchange user-plane and control-plane data. Additionally, the base station 121 and the base station 122 can communicate using an Xn interface, or an X2 interface, at 117 to exchange user-plane and control-plane data. The 5GC 150 includes an Access and Mobility Management Function 152 (AMF 152) that provides control-plane functions such as registration and authentication of multiple UE devices 110, authorization, mobility management, or the like in the 5G NR network. The AMF 152 communicates with the base stations 120 in the RAN 140. The AMF 152 also communicates with multiple UE devices 110, via the base stations 120.

Example Devices

Figure 2:
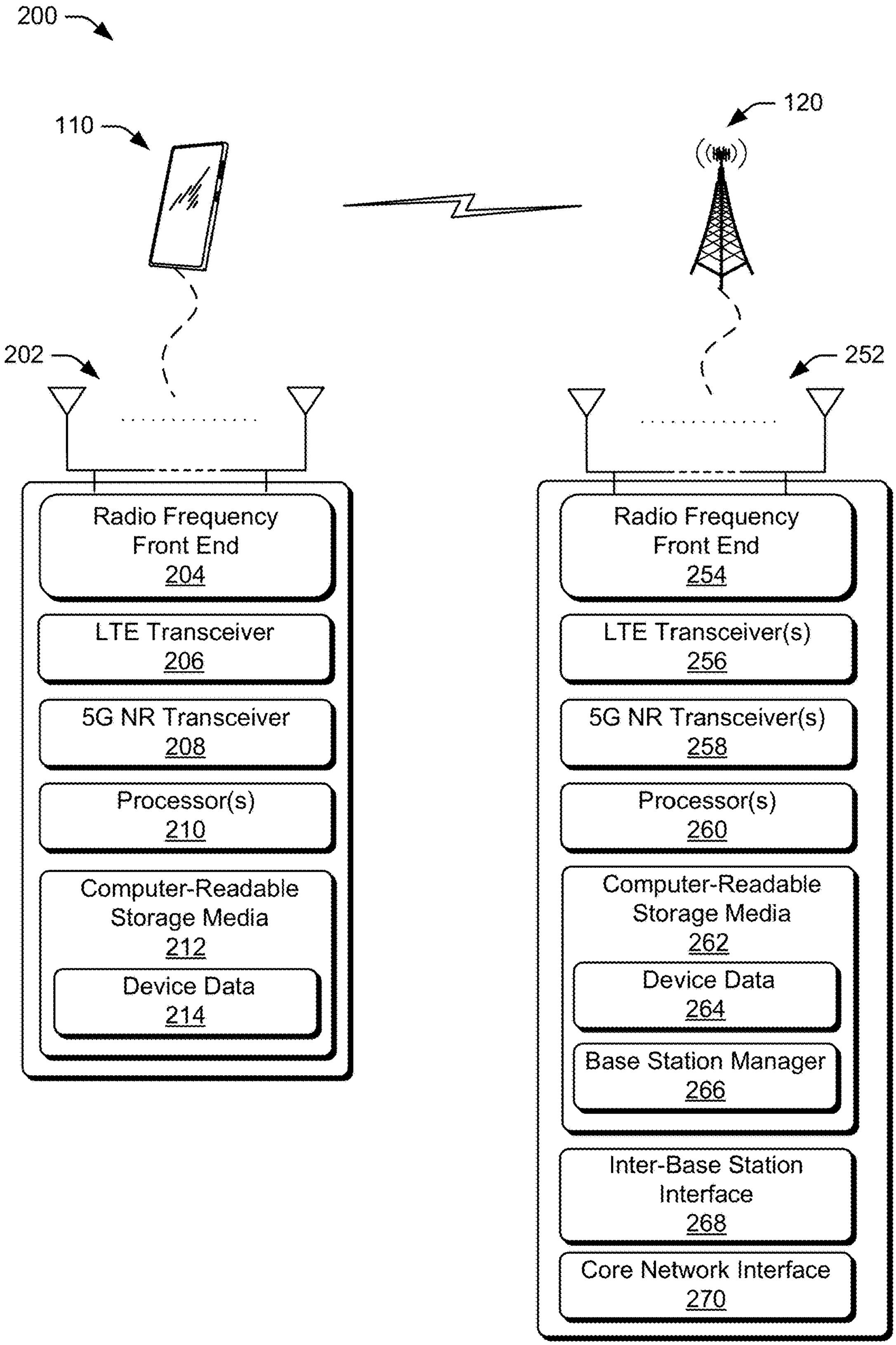
FIG. 2 illustrates an example device diagram of a user equipment and a serving cell base station.

FIG. 2 illustrates an example device diagram 200 of the UE 110 and the base station 120. The UE 110 and the base station 120 may include additional functions and interfaces omitted from FIG. 2 for the sake of clarity. The UE 110 includes antennas 202, a radio frequency front end 204 (RF front end 204), an LTE transceiver 206, and a 5G NR transceiver 208 for communicating with one or more base stations 120 in the 5G RAN 140. The RF front end 204 of the UE 110 can couple or connect the LTE transceiver 206, and the 5G NR transceiver 208 to the antennas 202 to facilitate various types of wireless communication. The antennas 202 of the UE 110 may include an array of multiple antennas that are configured similar to, or differently from, each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards.

The UE 110 also includes processor(s) 210 and computer-readable storage media 212 (CRM 212). The processor 210 may be a single-core processor or a multiple-core processor composed of a variety of materials, such as silicon, poly-silicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the UE 110. The device data 214 includes user data, multimedia data, beamforming codebooks, applications, and/or an operating system of the UE 110, which are executable by processor(s) 210 to enable user-plane communication, control-plane signaling, and user interaction with the UE 110.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency bands defined by the 3GPP LTE and 5G NR communication standards, and implemented by radio-frequency transceivers, such as the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base stations 120 also include processor(s) 260 and computer-readable storage media 262 (CRM 262). The processor 260 may be a single-core processor or a multiple-core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the UE 110.

CRM 262 also includes a base station manager 266. Alternatively, or additionally, the base station manager 266 may be implemented in whole or part as hardware logic or circuitry integrated with or separate from other components of the base stations 120. In at least some aspects, the base station manager 266 configures the LTE transceivers 256 and the 5G NR transceivers 258 for communication with the UE 110, as well as communication with a core network. The base stations 120 include an inter-base station interface 268, such as an Xn, an X2, and/or an F1 interface, which the base station manager 266 configures to exchange user-plane and control-plane data between another base station 120 and to manage the communication of the base stations 120 with the UE 110. The F1 interface is a logical interface that connects a gNB-CU and a gNB-DU. The base stations 120 include a core network interface 270 that the base station manager 266 configures to exchange user-plane and control-plane data with core network functions and entities.

User Plane and Control Plane Signaling

Figure 3:
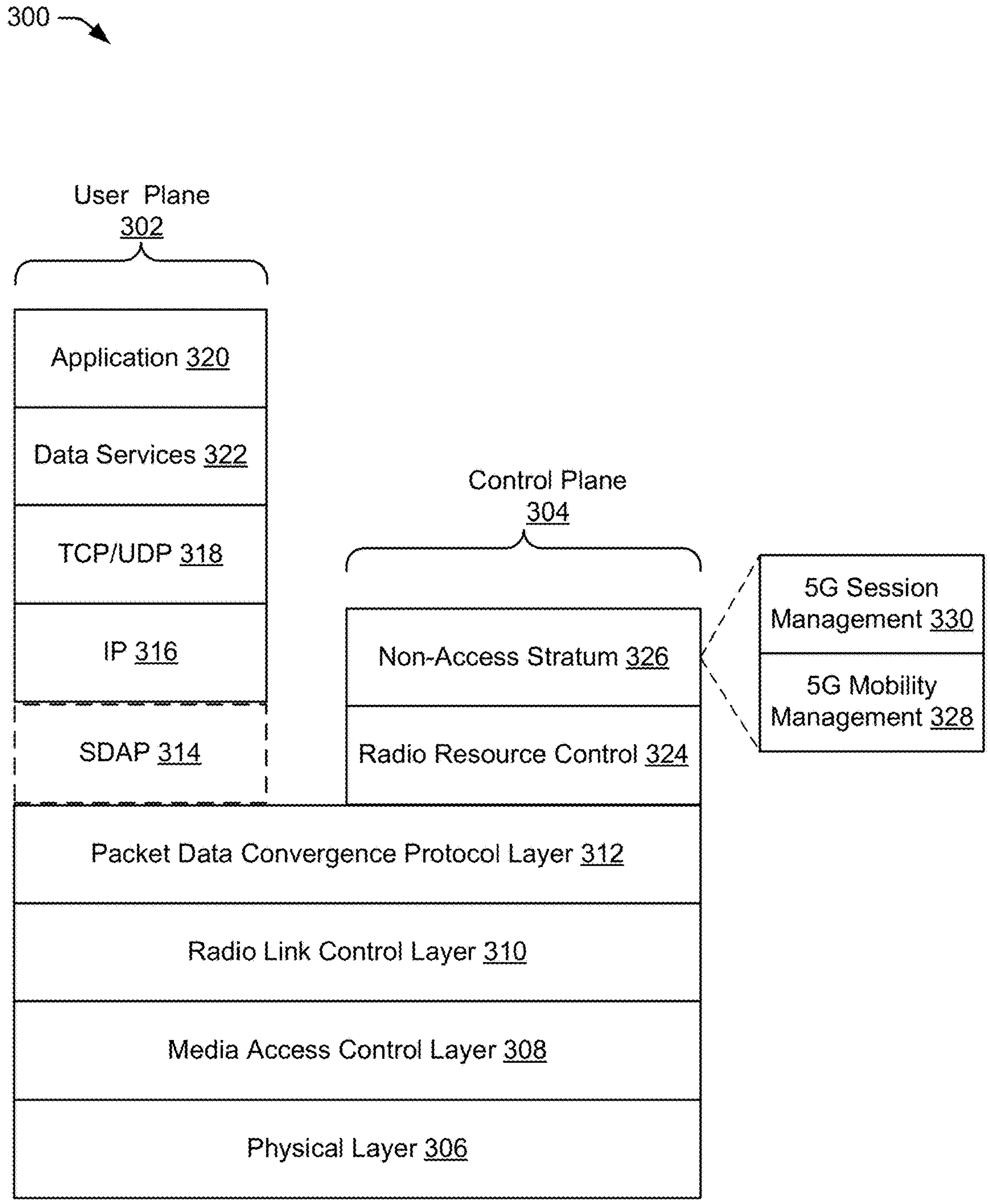
FIG. 3 illustrates an example wireless networking stack with which aspects of the described techniques can be implemented.

FIG. 3 illustrates an example block diagram 300 of a wireless network stack model 300 that characterizes a communication system for the example environment 100, in which various aspects of handling mobility management state transitions after fallback to RRC establishment can be implemented. The wireless network stack 300 includes a user plane 302 and a control plane 304. Upper layers of the user plane 302 and the control plane 304 share common lower layers in the wireless network stack 300. Wireless devices such as the UE 110 or base stations 120 implement each layer as an entity for communication with another device using the protocols defined for the layer. For example, a UE 110 uses a Packet Data Convergence Protocol (PDCP) entity to communicate to a peer PDCP entity in a base station 120 using the PDCP.

The shared lower layers include a physical layer 306 (PHY layer 306), a Media Access Control layer 308 (MAC layer 308), a Radio Link Control layer 310 (RLC layer 310), and a Packet Data Convergence Protocol layer 312 (PDCP layer 312). The physical layer 306 provides hardware specifications for devices that communicate with each other. As such, the physical layer 306 establishes how devices connect to each other, assists in managing how communication resources are shared among devices, and the like.

The MAC layer 308 specifies how data is transferred between devices. Generally, the MAC layer 308 provides a way in which data packets being transmitted are encoded and decoded into bits as part of a transmission protocol.

The RLC layer 310 provides data transfer services to higher layers in the wireless network stack 300. Generally, the RLC layer 310 provides error correction, packet segmentation and reassembly, and management of data transfers in various modes, such as acknowledged, unacknowledged, or transparent modes.

The PDCP layer 312 provides data transfer services to higher layers in the wireless network stack 300. Generally, the PDCP layer 312 provides transfer of user-plane 302 and control-plane 304 data, header compression, ciphering, and integrity protection.

Above the PDCP layer 312, the wireless network stack splits into the user-plane stack 302 and the control-plane stack 304. The user-plane 302 layers include an optional Service Data Adaptation Protocol layer 314 (SDAP 314), an Internet Protocol layer 316 (IP 316), a Transmission Control Protocol/User Datagram Protocol layer 318 (TCP/UDP 318), and an application 320 that transfer data via the wireless link 106. The optional SDAP layer 314 is present in 5G NR networks and maps a Quality of Service (QoS) flow for each data radio bearer and marks QoS flow identifiers in uplink and downlink data packets for each packet data session. The IP layer 316 specifies how the data from the application 320 is transferred to a destination node. The TCP/UDP layer 318 is used to verify that data packets intended to be transferred to the destination node reached the destination node, using either TCP or UDP for data transfers by the application 320. In some implementations, the user plane 302 may also include a data services layer 322 that provides data transport services to transport application data, such as IP packets including web browsing content, video content, image content, audio content, social media content, and so forth.

The control plane 304 includes Radio Resource Control 324 (RRC 324) and a Non-Access Stratum 326 (NAS 326). The RRC 324 establishes and releases connections and radio bearers, broadcasts system information, performs power control, and so forth. The RRC 324 supports 3GPP access but does not support non-3GPP access (e.g., Wi-Fi). The NAS 326 provides support for mobility management (e.g., via a 5GMM layer 328) and packet data bearer contexts (e.g., via a fifth-generation session management (5GSM) layer 330) between the user equipment 110 and entities or functions in the core network, such as the Access and Mobility Management Function 152 (AMF 152), or the Mobility Management Entity 162 (MME 162), or the like. The NAS 326 supports 3GPP access and non-3GPP access.

In the UE 110, each layer in both the user plane 302 and the control plane 304 of the wireless network stack 300 interacts with a corresponding peer layer or entity in a base station 120, a core network entity or function, and/or a remote service, to support user applications and control operation of the UE 110 in the NR RAN 141 or the E-UTRAN 142.

Example Messaging Transaction Diagrams

Figure 4:
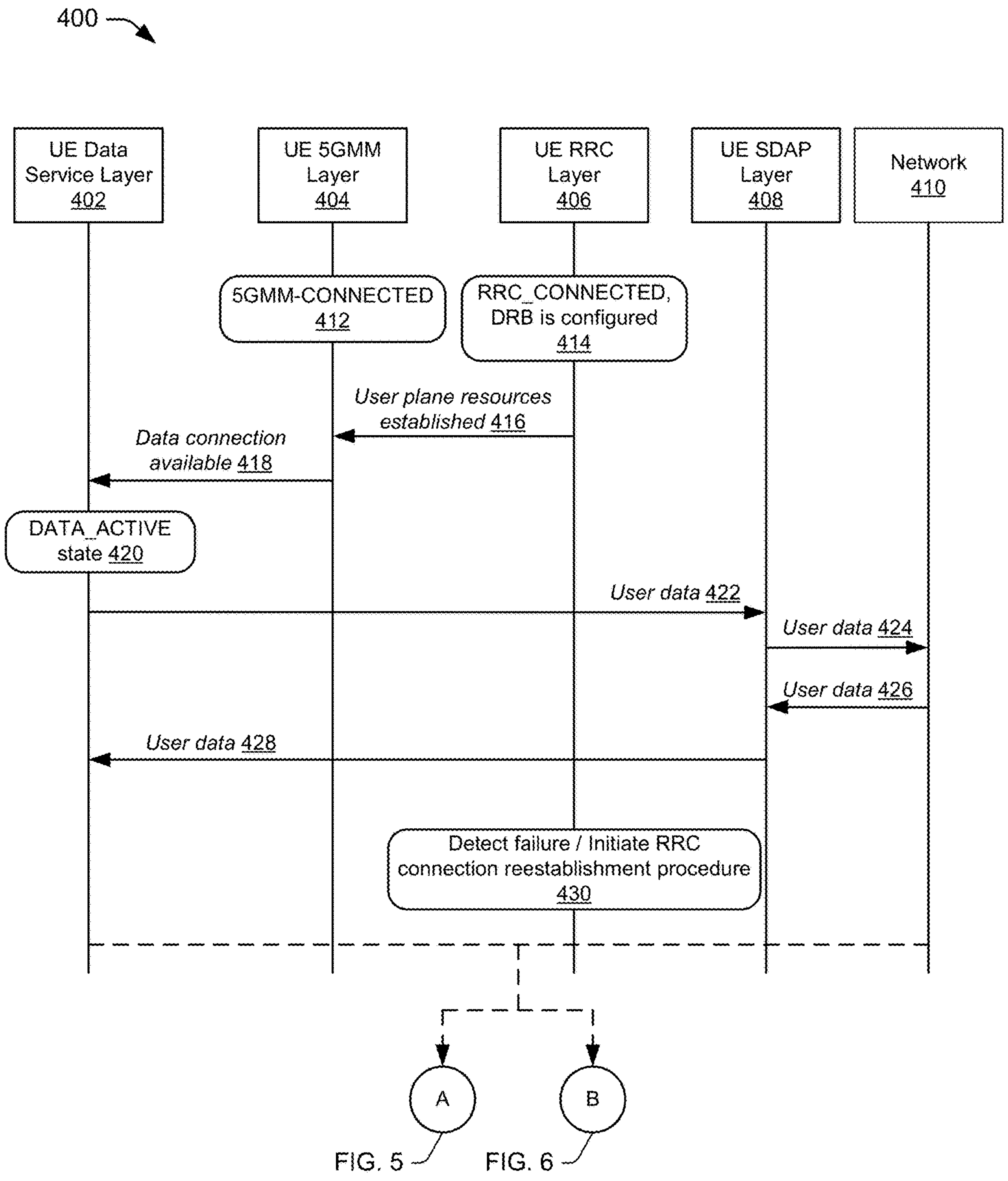
FIG. 4 illustrates an example message diagram of a UE in both a 5GMM-connected state and an RRC_CONNECTED state that detects a connection failure.

FIGS. 4-9 illustrate various example messaging transaction diagrams for handling mobility management state transitions after fallback to RRC establishment from an RRC connection reestablishment procedure or an RRC connection resume procedure. FIG. 4 describes a UE in both RRC_CONNECTED and 5GMM-connected states and leads either to FIG. 5 for handling mobility management state transitions after fallback to RRC establishment from an RRC reestablishment procedure or to FIG. 6 for handling the fallback without the mobility management state transitions.

Figure 7:
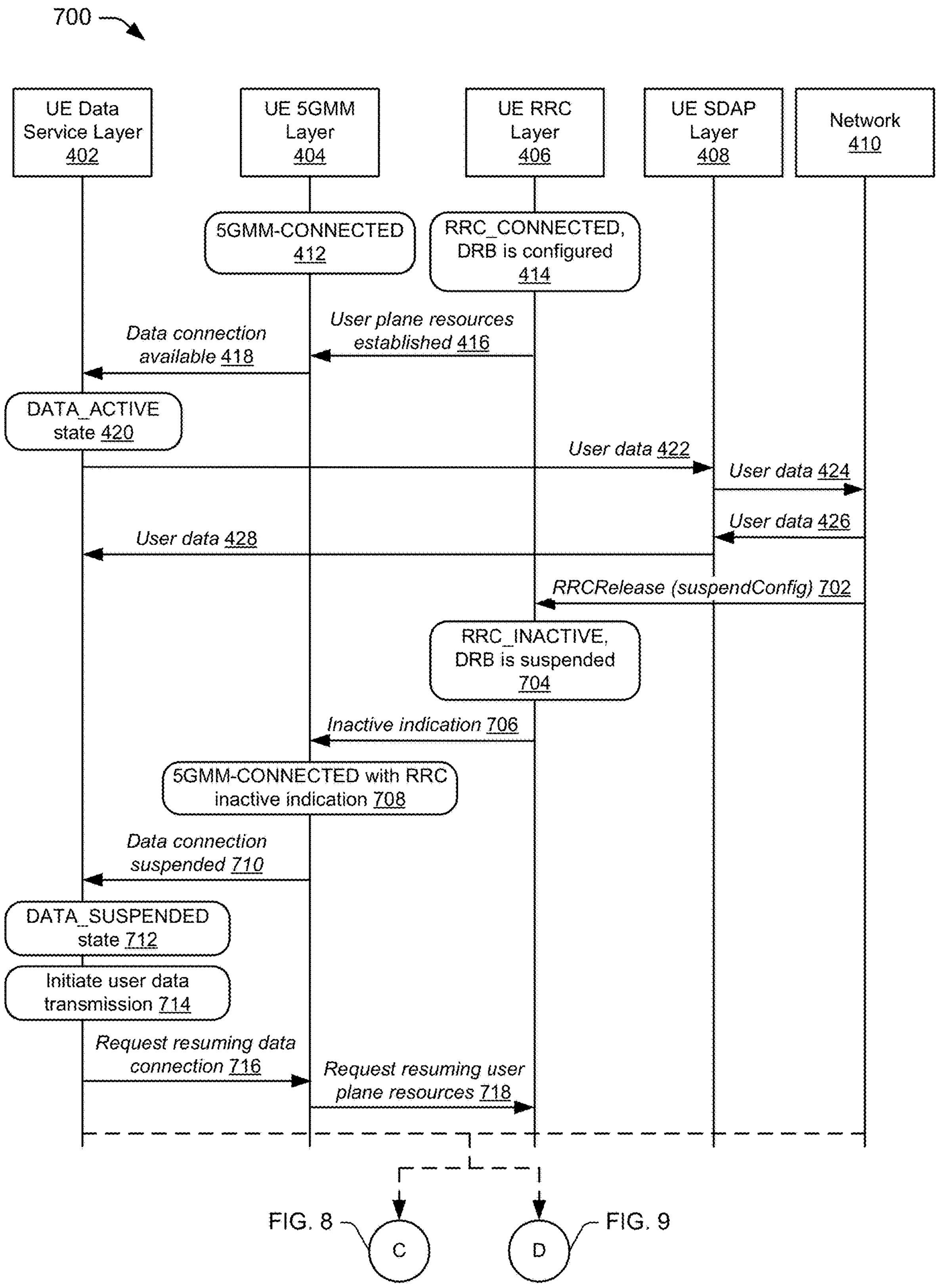
FIG. 7 illustrates a UE transitioning from both RRC_CONNECTED and 5GMM-connected states to an RRC_INACTIVE state and a 5GMM-connected-with-RRC-inactive-indication state.
Figure 8:
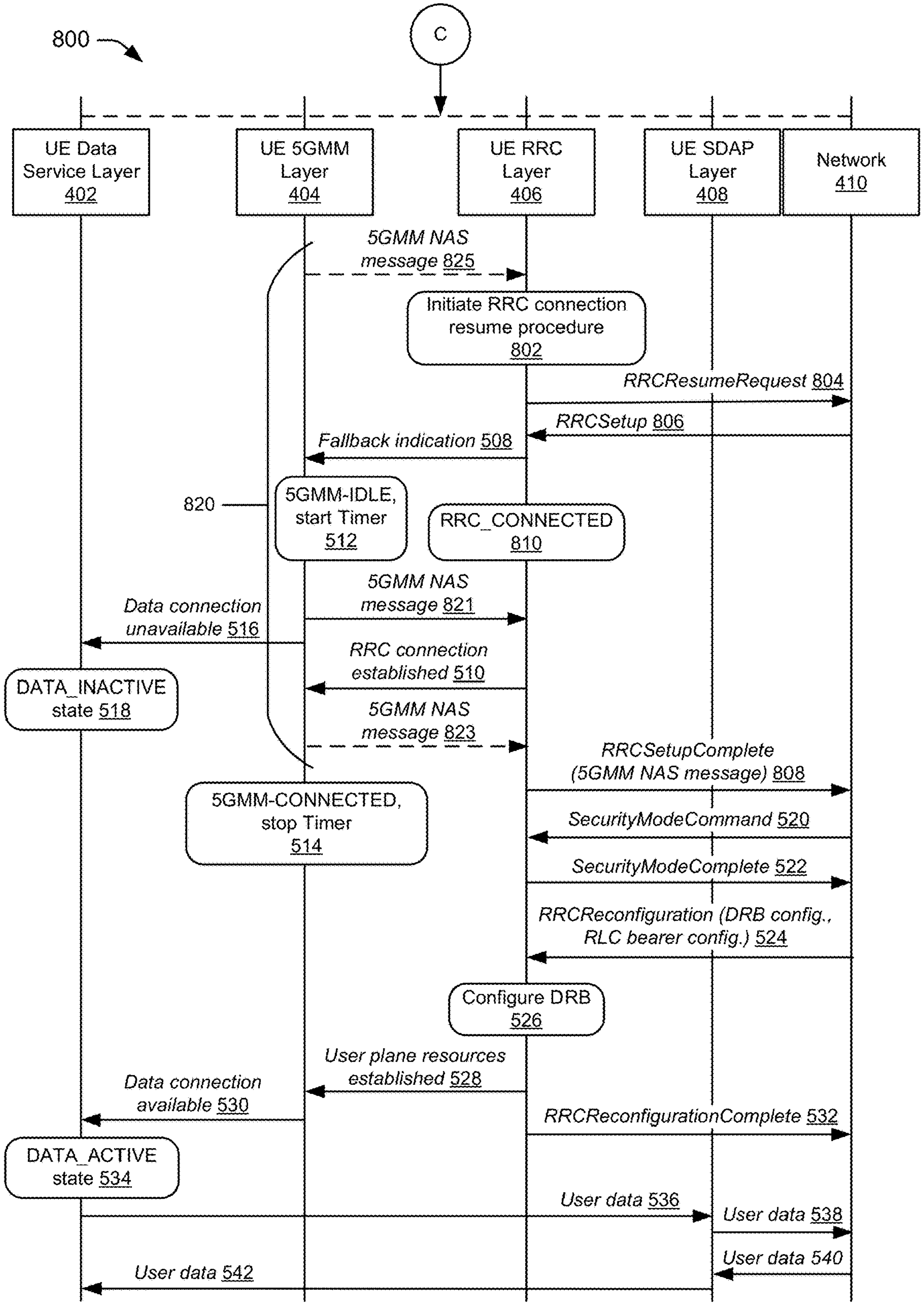
FIG. 8 continues from FIG. 7 and illustrates a fallback procedure corresponding to an RRC connection resume procedure.
Figure 9:
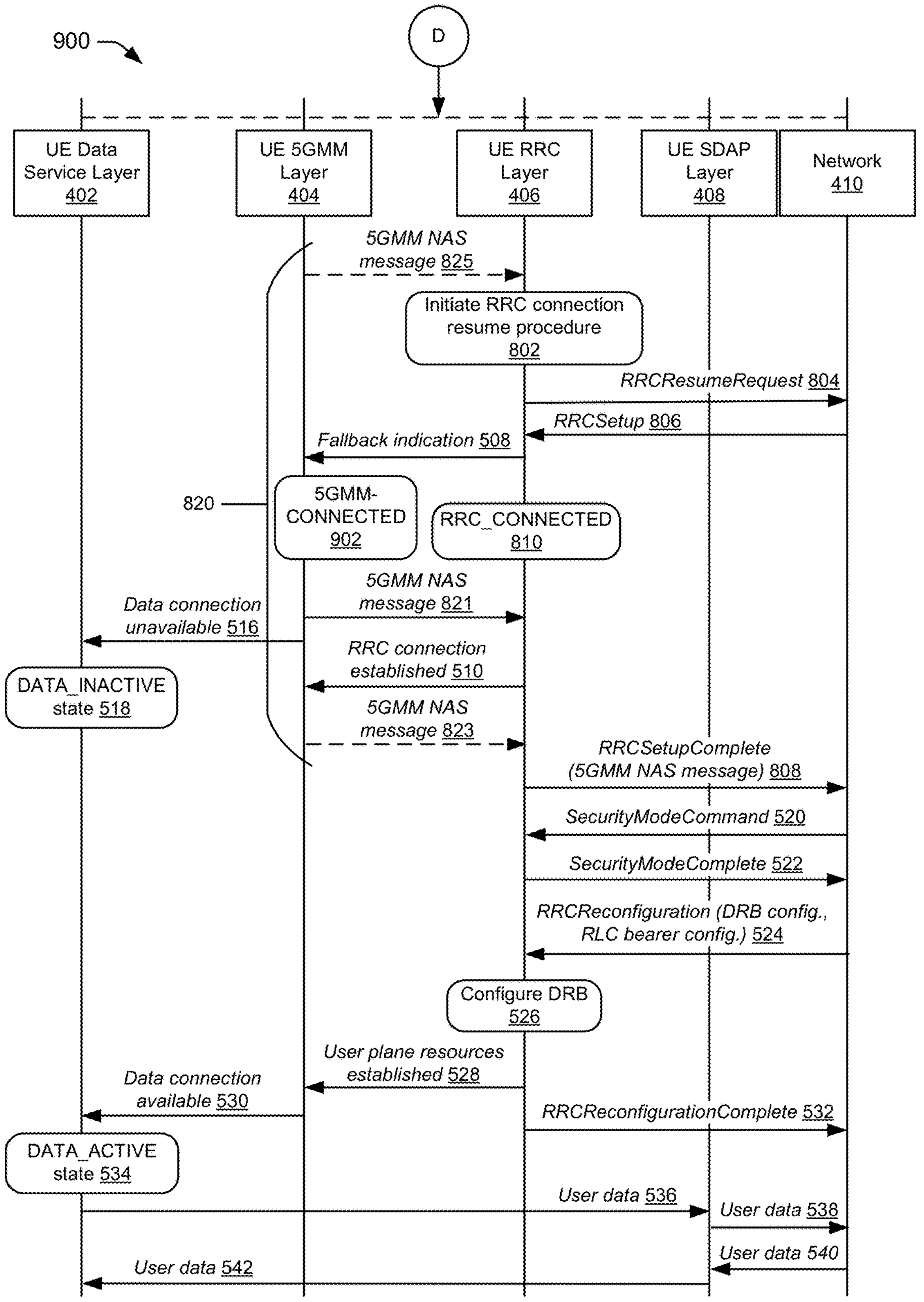
FIG. 9 continues from FIG. 7 and illustrates an alternative fallback procedure corresponding to an RRC connection resume procedure.

FIG. 7 illustrates a UE transitioning from both RRC_CONNECTED and 5GMM-connected states to an RRC_INACTIVE state and a 5GMM-connected-with-RRC-inactive-indication state, and FIG. 7 leads either to FIG. 8 for handling mobility management state transitions after fallback to RRC establishment from an RRC resume procedure or to FIG. 9 for handling the fallback without mobility management state transition to a 5GMM-idle state.

FIG. 4 illustrates an example message diagram 400 of a UE in both a 5GMM-connected state and an RRC_CONNECTED state that detects a connection failure. In the illustrated example, communications are transmitted between various layers of the communication protocol stack described in FIG. 3 of a UE and a network. For clarity, only a few layers of the wireless protocol stack of the UE are illustrated, although more layers may be involved to efficiently process messages. In FIG. 4, example protocol layers in the UE include a UE data service layer 402, a UE 5GMM layer 404, a UE RRC layer 406, and a UE SDAP layer 408. The UE uses these protocol layers to communicate with a network 410.

A UE in 5GMM-connected state 412 and RRC_CONNECTED state 414 communicates user data with a first base station in the network 410. In some implementations, when the UE has configured a data radio bearer (DRB) (e.g., at 414), the RRC layer 406 may provide an indication 416 indicating "user-plane resources established" to the 5GMM layer 404 of the UE. The 5GMM layer 404 may send an indication 418 indicating that a "data connection is available" (or established) to the data service layer 402 at the UE. The data service layer 402 performs data transmission and reception in response to the indication 418. The data service layer may enter a data_active state 420 in response to the indication 418.

In some implementations, when the UE has configured a DRB, the RRC layer 406 may indicate the data connection availability to the data service layer 402 directly. In other implementations, when the UE has configured a DRB, the RRC layer 406 may indicate the data connection availability to the data service layer 402 via a layer (e.g., 5G Session Management (5GSM) layer, a connection management layer) other than the 5GMM layer 404. In the implementations above, the data service layer 402 may transmit user data 422, 424 to a first base station of the network 410 via the SDAP layer 408 or receive user data 426, 428 from the first base station of the network 410 via the SDAP layer 408 when the data service layer 402 is informed that the data connection is available.

Figure 5:
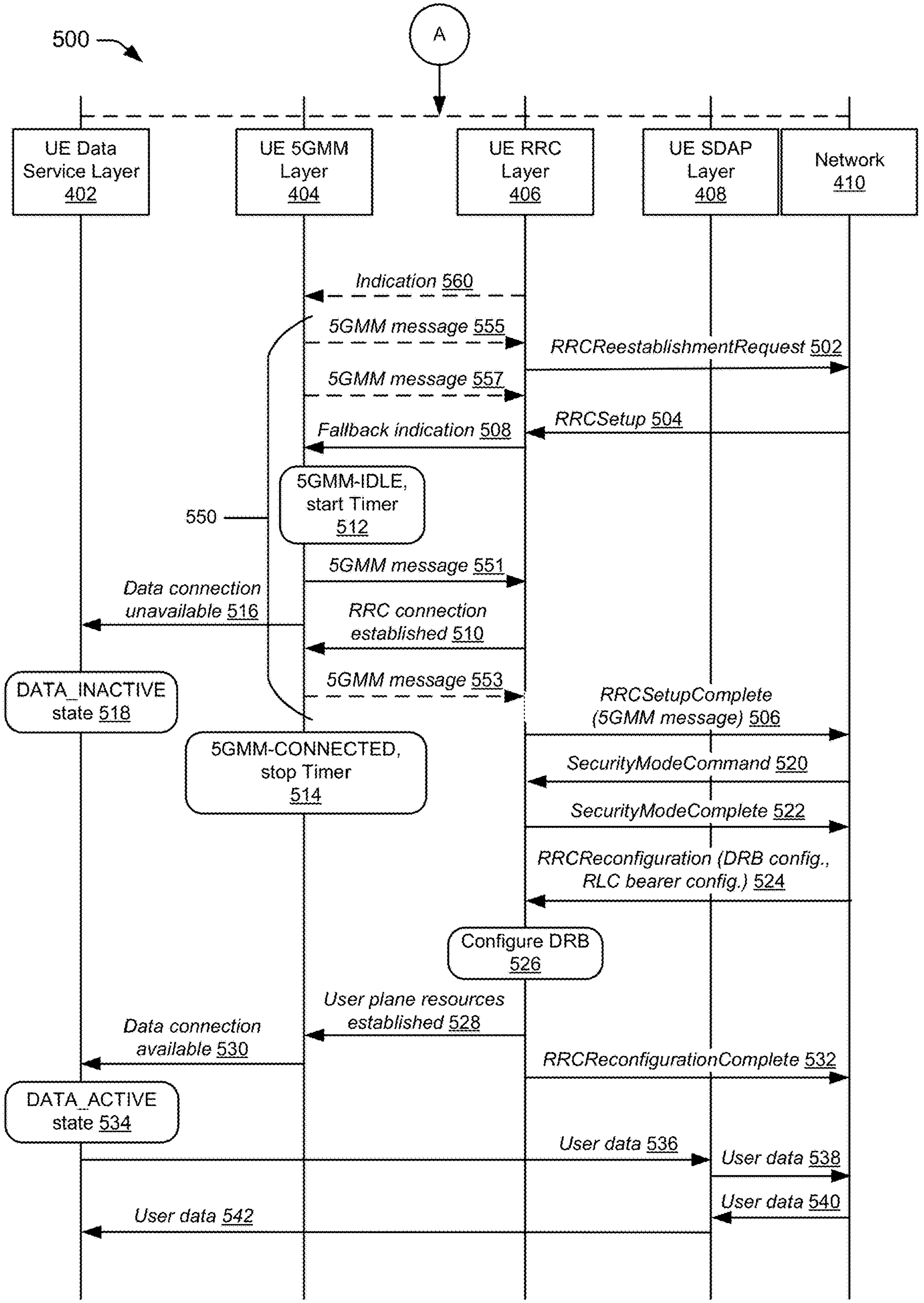
FIG. 5 continues from FIG. 4 and illustrates a fallback procedure corresponding to an RRC connection reestablishment procedure.
Figure 6:
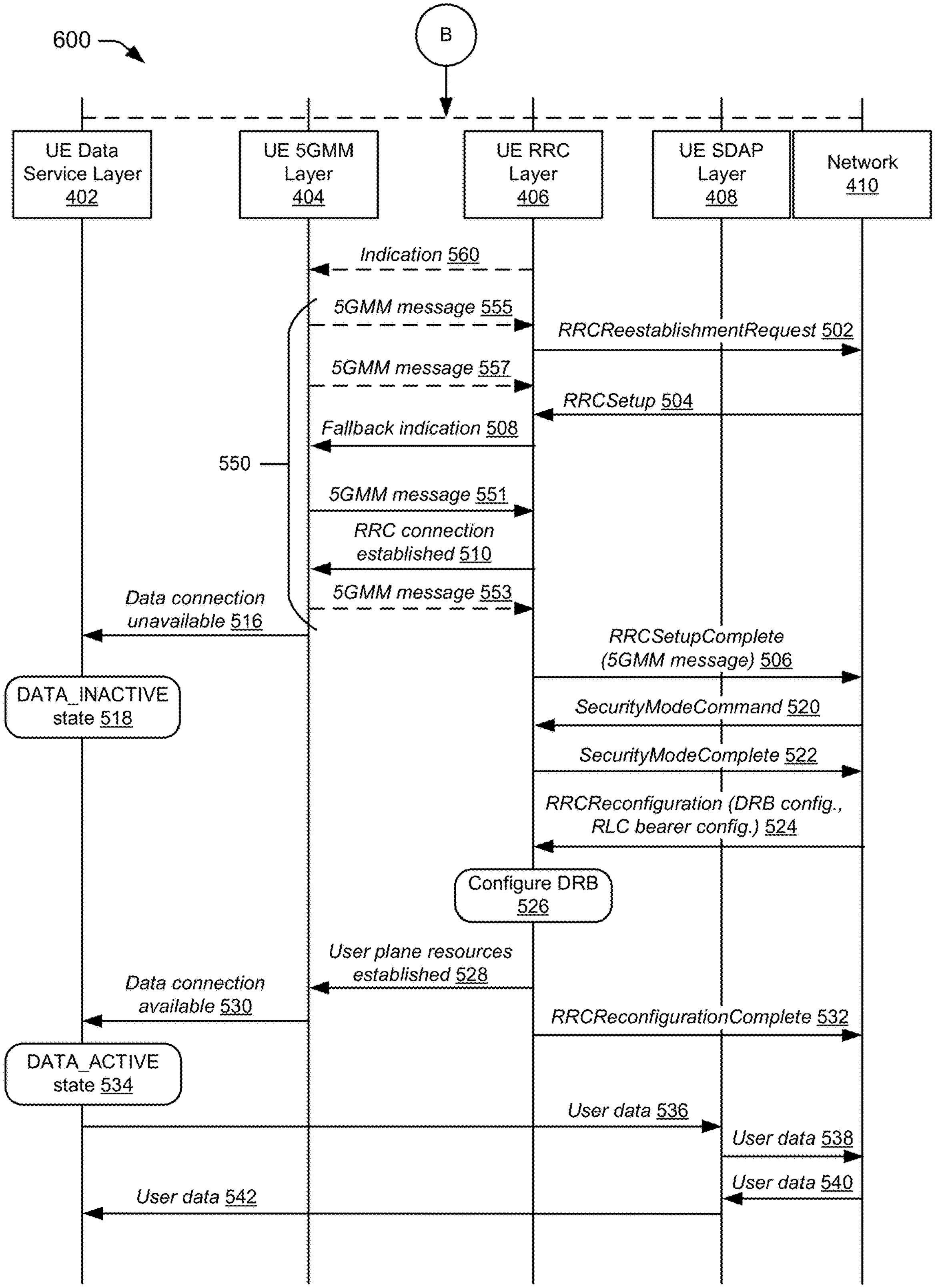
FIG. 6 continues from FIG. 4 and illustrates an alternative fallback procedure corresponding to an RRC connection reestablishment procedure.

In some aspects, the UE in both the 5GMM-connected state and the RRC_CONNECTED state may detect a connection failure 430, such as a radio link failure or other failure associated with the wireless connection to the network, and initiate an RRC connection reestablishment procedure. At this point, the message diagram can proceed to either of two alternative paths depending on the 5GMM state transitions implemented in the UE: option "A" (described in FIG. 5) or option "B" (described in FIG. 6). FIG. 5 depicts a message diagram 500 of the UE first transitioning to a 5GMM-idle state in response to a fallback indication and then transitioning to a 5GMM-connected state from the 5GMM-idle state in response to an indication that an RRC connection is established. In contrast, FIG. 6 depicts a message diagram 600 of the UE maintaining the 5GMM-connected state in response to the fallback indication, without transitioning to the 5GMM-idle state.

Continuing to option "A" in FIG. 5, the UE, in response to initiating the RRC connection reestablishment procedure, transmits (from the RRC layer 406) an RRC reestablishment request message 502 (RRCReestablishmentRequest) to the network 410. If the network cannot reestablish the connection, the UE receives an RRC setup message 504 (RRCSetup) from a second base station of the network 410. The UE then transmits an RRC setup complete message 506 (RRCSetupComplete) to the second base station in response to the RRC setup message 504. Also, in response to the RRC setup message 504, the RRC layer 406 of the UE provides a fallback indication 508 indicating "fallback of the RRC connection" and also an indication 510 indicating "RRC connection established" to the 5GMM layer 404 of the UE. In addition, the RRC layer 406 remains in the RRC_CONNECTED state.

In some implementations, the RRC layer 406 may send (or deliver) to the 5GMM layer 404 a single indication indicating both the "fallback of the RRC connection" and the "RRC connection established". In one example, the single indication may be simplified to indicate "RRC connection established" and the 5GMM layer 404 can determine both the fallback of the RRC connection based on the single indication and which state the 5GMM layer 404 is currently in. For example, if the 5GMM layer 404 is in 5GMM-idle state and receives the simplified single indication, then the 5GMM layer 404 determines that an RRC connection has been established by the RRC layer 406. If the 5GMM layer 404 is in 5GMM-connected state and receives the simplified single indication, then the 5GMM layer 404 can determine that the fallback of the RRC connection has occurred. In this case, the simplified single indication still indicates (at least inherently) the fallback of the RRC connection. Returning to the initial-described implementation, the RRC layer 406 may send the 5GMM layer 404 a first indication (e.g., fallback indication 508) indicating the "fallback of the RRC connection" and also a second indication (e.g., indication 510) indicating the "RRC connection established".

In response to the fallback indication 508, the 5GMM layer 404 transitions to the 5GMM-idle state 512 from the 5GMM-connected state 412. In addition, the 5GMM layer 404 may start a timer (e.g., T3512) in response to the fallback indication 508. In response to the indication 510 indicating "RRC connection established", the 5GMM layer 404 enters the 5GMM-connected state 514 from the 5GMM-idle state 512. The 5GMM layer 404 may also stop the timer (e.g., T3512) in response to the indication 510. Conventional systems do not indicate to the 5GMM layer 404 that the RRC connection is established, resulting in a failure to trigger the 5GMM layer 404 to transition to the 5GMM-connected state 514 and stop the timer.

In some implementations, the 5GMM layer 404 may send an indication 516 indicating "data connection unavailable" to the data service layer 402 at the UE in response to receiving the fallback indication 508. The data service layer 402 stops data transmission and reception in response to the indication 516 and may transition to a data_inactive state 518 from the data_active state 420, in response to the indication 516.

After the network 410 receives the RRC setup complete message 506, the second base station transmits a security message 520 (SecurityModeCommand) activating security to the UE. Then, in response to the security message 520, the UE sends a security mode complete message 522 (SecurityModeComplete) to the second base station of the network 410. After receiving the security mode complete message 522, the second base station of the network 410 transmits an RRC reconfiguration message 524 (RRCReconfiguration) to the UE to enable the UE to configure a data radio bearer (DRB) 526. In aspects, the RRC reconfiguration message 524 may include an RLC bearer configuration to enable the UE to configure an RLC bearer. In some implementations, the RRC layer 406 sends an indication 528 indicating that "user-plane resources are established" to the 5GMM layer 404 when the DRB is configured. In response to the indication 528 indicating available user-plane resources, the 5GMM layer 404 sends an indication 530 indicating "data connection available". After configuring the DRB 526, the RRC layer 406 also sends an RRC reconfiguration complete message 532 (RRCReconfigurationComplete) to the network 410 to inform the network 410 of successful completion of the connection reconfiguration.

In some implementations, when the UE has configured a DRB, the RRC layer 406 may directly indicate the "data connection available" to the data service layer 402 rather than via the 5GMM layer 404. In other implementations, when the UE has configured a DRB, the RRC layer 406 may indicate the "data connection available" to the data service layer 402 via a layer (e.g., 5GSM layer, connection management layer) other than the 5GMM layer 404. Based on the indication 530 of the "data connection available", the data service layer 402 can enter a data_active state 534 to enable transmission and reception of user data. In the implementations above, the data service layer 402 may transmit user data 536, 538 to a first base station of the network 410 via the SDAP layer 408 or receive user data 540, 542 from the first base station of the network 410 via the SDAP layer 408 when the data service layer 402 is informed of the "data connection available".

In aspects, the 5GMM layer 404 may submit a 5GMM message 550 to the RRC layer 406 to request that the RRC layer 406 transmit the 5GMM message 550 (e.g., 5GMM message 551, 553, 555, 557) to the network 410. The 5GMM message 550 may include a service request message or a registration request message. As shown in FIG. 5, the timing for when a 5GMM message 550 is sent to the RRC layer 406 can vary. In some implementations, the 5GMM layer 404 may submit the 5GMM message 551 to the RRC layer 406 in response to the fallback indication 508. Alternatively, the 5GMM layer 404 entering the 5GMM-idle state 512 can trigger both the 5GMM message 551 to the RRC layer 406 and the indication 516 indicating "data connection unavailable" to the data service layer 402. In an example, the 5GMM layer 404 may submit the 5GMM message 553 to the RRC layer 406 in response to the indication 510 indicating "RRC connection established".

In some implementations, the RRC layer 406 may send an indication 560 including a failure indication, an RRC reestablishment indication, or a 5GMM message preparation indication in response to detecting the failure 430. In this case, the 5GMM layer 404 may submit a 5GMM message 555, 557 to the RRC layer 406 in response to the indication 560 of the failure, the RRC reestablishment, or the 5GMM message preparation request. The 5GMM layer 404 may submit the 5GMM message 550 before sending the RRC reestablishment request message 502, as illustrated by 5GMM message 555, or after sending the RRC reestablishment request message 502, as illustrated by 5GMM message 557. This may ensure that the RRC layer 406 has sufficient processing time to generate the RRC setup complete message 506 and include the 5GMM message 550 in the RRC setup complete message 506. In this case, if the UE receives an RRC reestablishment message instead of the RRC setup message 504 in response to the RRC reestablishment request message 502, the UE may discard the previously-received 5GMM message 555, 557. Accordingly, the UE does not use the 5GMM message 555, 557 when discarding the 5GMM message 555, 557.

Alternatively, the 5GMM layer 404 may submit (or provide) the 5GMM message 550 to the RRC layer 406 before the failure (not shown). Thus, the RRC layer 406 can have sufficient processing time to generate the RRC setup complete message.

In the implementations above, the RRC layer includes the 5GMM message 550 in an RRC setup complete message 506 and transmits the RRC setup complete message 506 to the second base station in response to the RRC setup message 504.

The first and second base stations may be the same base station or different base stations. In an example, the first and second base stations may be gNBs.

An example process utilized in a UE based on FIG. 5 may include the UE transmitting (e.g., by the RRC layer 406) an RRC reestablishment request message to a network. Then, the UE receives (e.g., at the RRC layer 406) an RRC setup message from the network instead of an RRC connection reestablishment message. In one example, the UE determines an NAS signaling connection established in response to the RRC setup message 504. Also responsive to the RRC setup message 504, the UE transitions (e.g., by the 5GMM layer 404) to a 5GMM-idle state from a 5GMM-connected state. In addition, the UE (e.g., the 5GMM layer 404 of the UE) initializes at least one variable used at a 5GMM layer or starts a timer in response to transitioning from the 5GMM-connected state to the 5GMM-idle state. In an example, the at least one variable may store counter value(s), sub-state, or other information. The UE can initialize the variable(s) by setting or resetting the variable(s) to predetermined value(s), predetermined sub-state, or predetermined information.

Returning to the failure detection 430 in FIG. 4, the process may alternatively continue to option "B", which is described in FIG. 6. In contrast to FIG. 5, FIG. 6 depicts an example of handling the fallback of the RRC connection without the mobility management state transitions. Here, the UE in the 5GMM-connected state and the RRC_CONNECTED state initiates an RRC connection reestablishment procedure in response to a failure detected by the UE. Upon initiating the RRC connection reestablishment procedure, the UE transmits the RRC reestablishment request message 502 (RRCReestablishmentRequest) to the network 410. The UE receives the RRC setup message 504 (RRCSetup) from a second base station of the network 410 in response to the RRC reestablishment request message 502. In response to the RRC setup message 504, the UE transmits an RRC setup complete message 506 (RRCSetupComplete) to the second base station. The RRC layer 406 of the UE provides a fallback indication 508 to the 5GMM layer 404 of the UE indicating "fallback of the RRC connection", an indication 510 indicating "RRC connection established", or both indications 508, 510 in response to the RRC setup message 504. In aspects, the RRC layer 406 remains in the RRC_CONNECTED state in response to the RRC setup message 504.

When receiving the fallback indication 508 or the indication 510 indicating "RRC connection established", the 5GMM layer 404 stays in (or maintains) the 5GMM-connected state. Accordingly, in this implementation the 5GMM layer 404 is not triggered to enter the 5GMM-idle state (in contrast with FIG. 5). In some implementations, the fallback indication 508 indicating "fallback of the RRC connection" may not be needed. Rather, the 5GMM layer 404 can determine the fallback of the RRC connection based on the indication 510 indicating "RRC connection established" and the current state of the 5GMM layer. For example, if the 5GMM layer 404 is in the 5GMM-idle state and receives the indication 510, the 5GMM layer 404 can determine that an RRC connection has been established by the RRC layer 406 (e.g., not the fallback of the RRC connection). If, however, the 5GMM layer 404 is in 5GMM-connected state and receives the indication 510, the 5GMM layer 404 can determine that the fallback of the RRC connection has occurred. In this case, the indication 510 indicates (at least inherently) the fallback of the RRC connection. In some implementations, the fallback indication 508 of "fallback of the RRC connection" and the indication 510 of the "RRC connection established" may be a single indication.

In aspects, the 5GMM layer 404 does not start a timer (e.g., T3512) in response to the fallback indication 508 of the "fallback of the RRC connection" or the indication 510 indicating "RRC connection established". In addition, the 5GMM layer 404 may send an indication 516 indicating "data connection unavailable" to the data service layer 402 at the UE in response to the fallback indication 508 (e.g., the data connection is unavailable because the UE has no DRB due to the fallback). Then, the data service layer 402 stops data transmission and reception in response to the indication 516. In addition, the data service layer 402 may transition to the data_inactive state 518 from the data_active state 420, in response to the indication 516.

The illustrated messages 520-560 in FIG. 6 are performed as described with respect to FIG. 5 (except that the 5GMM layer 404 does not send the 5GMM message 550 in response to entering the 5GMM-idle state 512 because the 5GMM layer 404 does not enter the 5GMM-idle state 512 in the scenario described in FIG. 6). Because the 5GMM layer 404 has no state transition, the lower layers (e.g., RRC layer 406) are relied on to inform the 5GMM layer 404 that the user-plane resources are established when the RRC layer 406 configures the DRB according to the configurations received from the network 410.

An example process utilized in a UE based on FIG. 6 may include the UE in a 5GMM-connected state transmitting (e.g., by the RRC layer 406 of the UE) an RRC reestablishment request message to a network. Then, the UE receives (e.g., at the RRC layer 406) an RRC setup message from the network instead of an RRC connection reestablishment message. Responsive to the RRC setup message, the UE maintains the 5GMM-connected state and does not transition to a 5GMM-idle state. In addition, the UE (e.g., the 5GMM layer 404 of the UE) initializes at least one variable used at a 5GMM layer at the UE or starts a timer in response to the RRC setup message. The variable(s) may include counter value(s), sub-state, or stored information. The UE can initialize the variable(s) by setting or resetting the variable(s) to predetermined value(s), predetermined sub-state, or predetermined information.

FIG. 7 illustrates a message diagram 700 of a UE transitioning from both RRC_CONNECTED and 5GMM-connected states to an RRC_INACTIVE state and a 5GMM-connected-with-RRC-inactive-indication state. For example, a UE in 5GMM-connected state 412 and RRC_CONNECTED state 414 communicates user data 422, 424 with a first base station in the network 410. Similar to above, when the UE has configured a DRB, the RRC layer 406 may provide an indication 416 indicating "user-plane resources established" to the 5GMM layer 404 of the UE. The 5GMM layer 404 may then send an indication 418 indicating "data connection available" (or established) to the data service layer 402 at the UE. The data service layer 402 may enter a data_active state 420 in response to the indication 418. In some implementations, when the UE has configured a DRB, the RRC layer 406 may indicate the "data connection available" to the data service layer 402 directly. In other implementations, when the UE has configured a DRB, the RRC layer 406 may indicate the "data connection available" to the data service layer 402 via another layer (e.g., 5GSM, a connection management layer) other than the 5GMM layer 404. In the implementations above, the data service layer 402 may transmit the user data 422, 424 to the first base station or receive user data 426, 428 from the first base station when the data service layer 402 is notified of the data connection being available.

At some point, the UE receives an RRC suspend message 702 (e.g., an RRCRelease message or an RRCConnectionRelease message) triggering the UE to enter the RRC_INACTIVE state 704 from the RRC_CONNECTED state. The RRC layer 406 also sends an inactive indication 706 to the 5GMM layer 404 indicating that the UE is entering or has entered the RRC_INACTIVE state. In response to the inactive indication 706, the 5GMM layer 404 enters a 5GMM-connected-with-inactive-indication state 708 from the 5GMM-connected state 412. The 5GMM layer 404 then indicates 710 "data connection suspended" to the data service layer 402 based on the inactive indication 706 received from the RRC layer 406. The data service layer 402 may then enter a data_suspended state 712 to suspend transmission and reception of user data.

After some period of time, the UE may obtain user data that is to be transmitted to the network. Responsively, the data service layer initiates a user data transmission 714 and sends a request to resume the data connection 716 to the 5GMM layer 406. The 5GMM layer 404 then sends a request to resume user-plane resources 718 to the RRC layer 406. At this point, the message diagram 700 can proceed to either of two alternative paths: option "C" (described in FIG. 8) or option "D" (described in FIG. 9). FIG. 8 describes a message diagram 800 of the UE first transitioning to a 5GMM-idle state in response to the fallback indication and then transitioning to a 5GMM-connected state from the 5GMM-idle state in response to an indication of the RRC connection being established. In contrast, FIG. 9 describes a message diagram 900 of the UE maintaining the 5GMM-connected state in response to the fallback indication, without transitioning to the 5GMM-idle state.

Continuing to option "C" in FIG. 8, in response to the request to resume user-plane resources 718, the UE in the 5GMM-connected-with-inactive-indication state and the RRC_INACTIVE state initiates an RRC connection resume procedure 802 to transmit the user data. Upon initiating the RRC connection resume procedure, the UE transmits an RRC resume request message 804 (RRCResumeRequest) to the network 410. If the UE receives an RRC setup message 806 (RRCSetup), rather than an RRC resume message, from a second base station of the network 410 in response to the RRC resume request message 804, the UE transmits an RRC setup complete message 808 (RRCSetupComplete) to the second base station. The RRC layer also provides to the 5GMM layer 404 of the UE the fallback indication 508 indicating "fallback of the RRC connection" and the indication 510 indicating "RRC connection established". In addition, the UE transitions to an RRC_CONNECTED state 810 from the RRC_INACTIVE state 704, in response to the RRC setup message 806.

In some implementations, the RRC layer 406 may send (or deliver) to the 5GMM layer 404 a single indication indicating both the "fall back of the RRC connection" and the "RRC connection established". In an example, the single indication may be simplified to indicate "RRC connection established" and the 5GMM layer 404 can determine the fallback of the RRC connection based on the single indication and the current state of the 5GMM layer 404. For example, if the 5GMM layer 404 is in the 5GMM-idle state and receives the simplified single indication, the 5GMM layer 404 can determine that an RRC connection has been established by the RRC layer 406. If, however, the 5GMM layer 404 is in the 5GMM-connected state and receives the simplified single indication, the 5GMM layer 404 can determine that the fallback of the RRC connection has occurred. In this case, the simplified single indication still indicates (at least inherently) the fallback of the RRC connection. In other implementations, the RRC layer 404 may send the 5GMM layer 406 a first indication indicating the "fallback of the RRC connection" and, asynchronously or in parallel, a second indication indicating the "RRC connection established".

In response to the fallback indication 508 indicating "fallback of the RRC connection", the 5GMM layer 404 transitions to 5GMM-idle state 512 from the 5GMM-connected-with-RRC-inactive-indication state 708. The 5GMM layer 404 may also start a timer (e.g., T3512) in response to the fallback indication 508. Responsive to the indication 510 indicating "RRC connection established", the 5GMM layer 404 enters the 5GMM-connected state 514 from the 5GMM-idle state 512. In addition, the 5GMM layer 404 may stop the timer (e.g., T3512) in response to the indication 510 indicating "RRC connection established".

In some implementations, the 5GMM layer 404 may send an indication 516 indicating "data connection unavailable" to the data service layer 402 at the UE in response to the fallback indication 508. Responsively, the data service layer 402 stops data transmission and reception. In addition, the data service layer 402 may transition to a data_inactive state 518 from the data_active state 420 in response to the indication 516.

Similar to FIG. 5, the second base station transmits a security message 520 (SecurityModeCommand) activating security to the UE after receiving the RRC setup complete message 808. The remaining messages 522-542 in FIG. 8 are performed as described with respect to FIG. 5.

In aspects, the 5GMM layer 404 may submit a 5GMM NAS message 820 to the RRC layer 406 to request that the RRC layer 406 transmit the 5GMM NAS message 820 to the network 410. The 5GMM NAS message 820 may include a service request message or a registration request message. The timing for when the 5GMM NAS message 820 is sent to the RRC layer 406 can vary in different instances. For example, the 5GMM layer 404 may submit a 5GMM NAS message 821 to the RRC layer 406 in response to the fallback indication 508. Alternatively, the 5GMM layer 404 may submit the 5GMM NAS message 823 to the RRC layer in response to the indication 510 indicating "RRC connection established".

In other implementations, the 5GMM layer 404 may submit a 5GMM NAS message 825 to the RRC layer 406 when determining to initiate user data transmission 714 or along with the request to resume the user-plane resources 718 (shown in FIG. 7), such that the RRC layer 406 receives the 5GMM NAS message 825 prior to initiating the RRC connection resume procedure 802. Alternatively, the 5GMM layer 404 may provide the 5GMM NAS message 820 to the RRC layer 406 before requesting to resume the data connection 716. Using these described techniques, the RRC layer can thus be provided sufficient processing time to generate the RRC setup complete message 808 with the 5GMM NAS message 820. In this case, if the UE receives an RRC resume message (RRCResume) instead of the RRC setup message 806, in response to the RRC resume request message 804, the UE may discard the 5GMM NAS message 825. The UE does not use the 5GMM NAS message 825 when discarding the 5GMM NAS message 825. In response to the RRC resume message, the RRC layer 406 sends the 5GMM layer 404 a resume indication (not shown) indicating that the UE is entering or has entered the RRC_CONNECTED state, that the RRC connection is resumed, or that the user-plane resources are established or available.

In the implementations above, the RRC layer 406 includes the 5GMM NAS message 820 in the RRC setup complete message 808 and transmits the RRC setup complete message 808 to the second base station in response to the RRC setup message 806. The first and second base stations may be the same base station or different base stations. In aspects, the first and second base stations may be gNBs or ng-eNBs.

An example process utilized in a UE based on FIG. 8 may include the UE transmitting an RRC resume request message (e.g., RRCResumeRequest or RRCConnectionResumeRequest) to a network. Then, the UE receives an RRC setup message (e.g., an RRC setup message or an RRC connection setup message) from the network in response to the RRC resume request message. In an example, the UE can determine a NAS signaling connection established in response to the RRC setup message. Responsive to the RRC setup message, the UE transitions to a 5GMM-idle state from a 5GMM-connected-with-inactive-indication state. In addition, the UE initializes at least one variable used at the 5GMM layer at the UE or starts a timer in response to transitioning to the 5GMM-idle state from the 5GMM-connected-with-inactive-indication state. In an example, the variable(s) may store counter value(s), sub-state or information. The UE can initialize the variable(s) by setting or resetting the variable(s) to predetermined value(s), predetermined sub-state, or predetermined information. In aspects, the RRC layer 406 of the UE performs the transmitting of the RRC resume request message and the receiving of the RRC setup message, and the 5GMM layer 404 performs the transitioning to the 5GMM-idle state and the initializing at least one variable used at the 5GMM layer 404. The example process may also include the UE (the 5GMM layer of the UE) transitioning to a 5GMM-connected state from the 5GMM-idle state in response to an RRC connection established (radio-resource-control connection-established) indication and/or message communicated by the RRC layer of the UE.

Returning to the request to resume the data connection 716 and the request to resume the user-plane resources 718 in FIG. 7, the process may alternatively continue to option "D" in FIG. 9. In contrast to FIG. 8, FIG. 9 depicts an example of handling the fallback of the RRC connection without transitioning the mobility management to an idle state. Here, the UE does not enter the 5GMM-idle state in response to the RRC setup message from the network.

For example, when the UE receives the RRC setup message 806 from the network, the RRC layer 406 provides the fallback indication 508 to the 5GMM layer 404 and enters the RRC_CONNECTED state 810 from the RRC_INACTIVE state 704. In response to the fallback indication 508, the 5GMM layer 404 transitions to a 5GMM-connected state 902 from the 5GMM-connected-with-RRC-inactive-indication state 708, rather than transitioning to the 5GMM-idle state as described in FIG. 8. Accordingly, the UE does not enter the 5GMM-idle state in this scenario. Because of this, the indication 510 indicating "RRC connection established" does not trigger the 5GMM layer 404 to transition to the 5GMM-connected state because the 5GMM layer 404 is currently connected. In this way, the 5GMM layer 404 stays in or maintains the 5GMM-connected state in response to the fallback indication 508.

In some implementations, the separate fallback indication 508 indicating "fallback of the RRC connection" may not be needed, and the 5GMM layer 404 can determine the fallback of the RRC connection based on the indication 510 indicating "RRC connection established" and which state the 5GMM layer is currently in. For example, if the 5GMM layer 404 is in the 5GMM-idle state and receives the indication 510, the 5GMM layer 404 can determine that an RRC connection has been established by the RRC layer 406 (e.g., not the fallback of the RRC connection). If, however, the 5GMM layer is in 5GMM-connected-with-inactive-indication state and receives the indication 510, the 5GMM layer 404 can determine that the fallback of the RRC connection occurred. In this case, the indication 510 still indicates (at least inherently) the fallback of the RRC connection.

In aspects, the 5GMM layer 404 does not start a timer (e.g., T3512) in response to the fallback indication 508 of the "fallback of the RRC connection" or the indication 510 indicating "RRC connection established".

In some implementations, the 5GMM layer 404 may send an indication 516 indicating "data connection unavailable" to the data service layer 402 at the UE in response to the fallback indication 508. Then, the data service layer 402 stops data transmission and reception in response to the indication 516. In addition, the data service layer 402 may transition to data_inactive state 518 from the data_active state 420, in response to the indication 516.

Similar to FIG. 8, after receiving the RRC setup complete message 808, the second base station transmits a security message 520 (SecurityModeCommand) activating security to the UE. Subsequent messages 522-542 illustrated in FIG. 9 are performed as described above with respect to FIG. 5.

Further, the 5GMM layer 404 may submit a 5GMM NAS message 820 (e.g., 5GMM NAS message 821, 823, 825) to the RRC layer 406 to request that the RRC layer 406 transmit the 5GMM NAS message 820 to the network 410. The 5GMM NAS message 820 may include a service request message or a registration request message. The timing for when the 5GMM NAS message 820 is sent to the RRC layer 406 can vary in different instances, as illustrated by the brace at 820. For example, the 5GMM layer 404 may submit a 5GMM NAS message 821 to the RRC layer 406 in response to the fallback indication 508. Alternatively, the 5GMM layer 404 may submit the 5GMM NAS message 823 to the RRC layer in response to the indication 510 indicating "RRC connection established".

In other implementations, the 5GMM layer 404 may submit the 5GMM NAS message 825 to the RRC layer 406 when determining to initiate user data transmission 714 or along with the request to resume the user-plane resources 718 (shown in FIG. 7), such that the RRC layer 406 receives the 5GMM NAS message 825 prior to initiating the RRC connection resume procedure 802. Alternatively, the 5GMM layer 404 may provide the 5GMM NAS message 820 to the RRC layer 406 before requesting to resume the data connection 716 (not shown). Using these described techniques, the RRC layer can thus be provided sufficient processing time to generate the RRC setup complete message 808 with the 5GMM NAS message 820. In this case, if the UE receives an RRC resume message (RRCResume) instead of the RRC setup message 806 in response to the RRC resume request message 804, the UE may discard the 5GMM NAS message 825. The UE does not use the 5GMM NAS message 825 when discarding the 5GMM NAS message 825. In response to the RRC resume message, the RRC layer 406 sends the 5GMM layer 404 a resume indication (not shown) indicating that the UE is entering or has entered the RRC_CONNECTED state, that the RRC connection is resumed, or that the user-plane resources are established or available.

In the implementations above, the RRC layer 406 includes the 5GMM NAS message 820 in the RRC setup complete message 808 and transmits the RRC setup complete message 808 to the second base station in response to the RRC setup message 806. The first and second base stations may be the same base station or different base stations. In aspects, the first and second base stations may be gNBs or ng-eNBs.

An example process utilized in a UE in a 5GMM-connected-with-RRC-inactive-indication state and an RRC_INACTIVE state may include the UE transmitting an RRC resume request message (e.g., RRCResumeRequest or RRCConnectionResumeRequest) to a network. Then, the UE receives an RRC setup message (e.g., an RRC setup message or an RRC connection setup message) from the network in response to the RRC resume request message. Responsive to the RRC setup message, the UE transitions to a 5GMM-connected state from a 5GMM-connected-with-inactive-indication state. In addition, the UE initializes at least one variable used at the 5GMM layer at the UE or starts a timer in response to transitioning to the 5GMM-connected state from the 5GMM-connected-with-inactive-indication state. In aspects, the variable(s) may store counter value(s), sub-state or information. The UE can initialize the variable(s) by setting or resetting the variable(s) to predetermined value(s), predetermined sub-state, or predetermined information. The RRC layer 406 of the UE may perform the transmitting of the RRC resume request message and the receiving of the RRC setup message, and the 5GMM layer 404 may perform the transitioning to the 5GMM-connected state and the initializing at least one variable used at the 5GMM layer 404.

Example Methods

Example methods 1000 and 1100 are described with reference to FIG. 10 and FIG. 11 in accordance with one or more aspects of handling mobility management state transitions after fallback to RRC establishment. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 10:
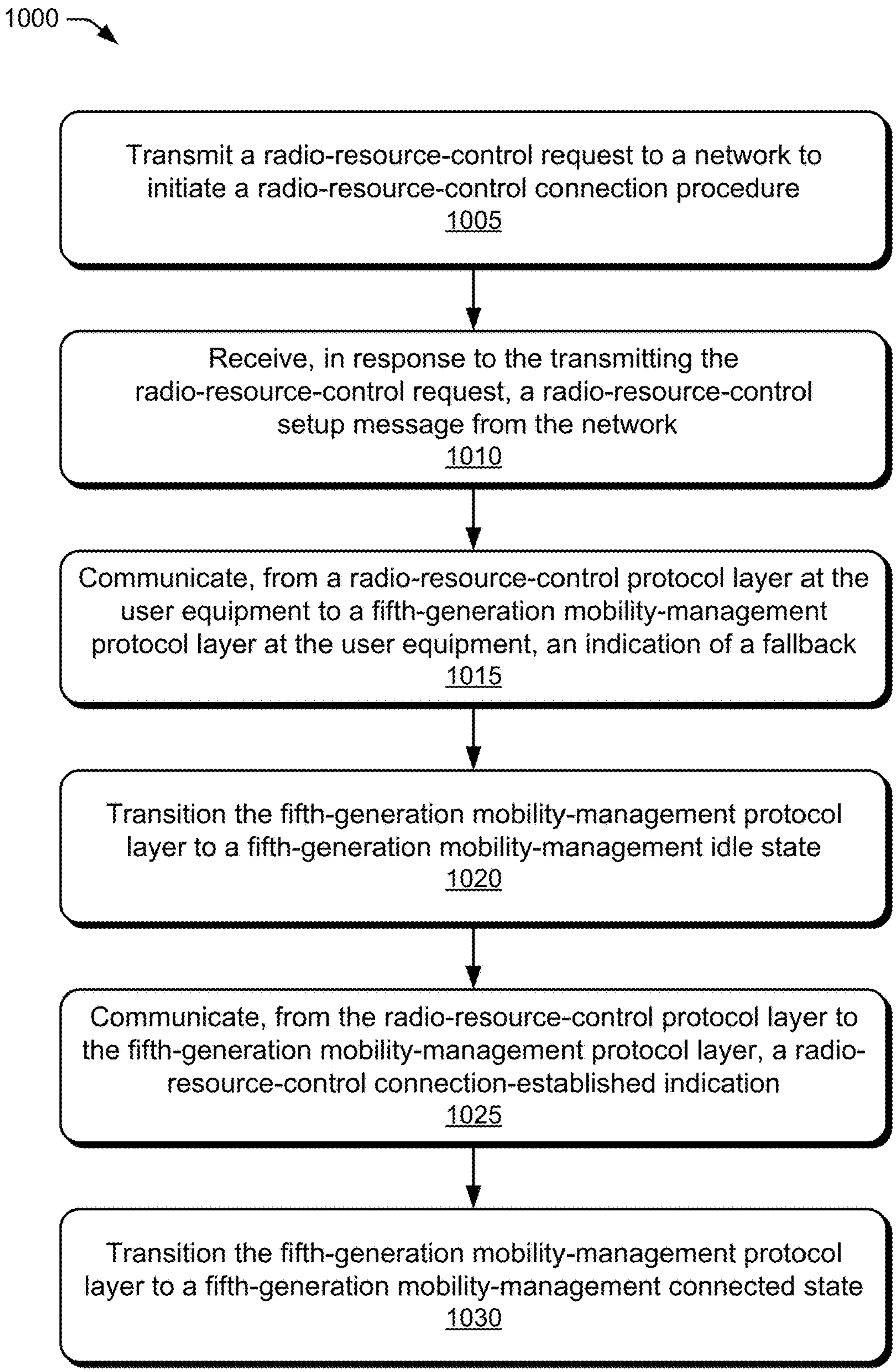
FIG. 10 illustrates an example method for handling mobility management state transitions after fallback to RRC establishment.

FIG. 10 illustrates an example method 1000 for handling mobility management state transitions after fallback to RRC establishment. In some implementations, operations of method 1000 are performed by a user equipment, such as UE 110 of FIG. 1.

At 1005, a UE transmits a radio resource control (RRC, radio-resource-control) request to a network to initiate an RRC connection procedure. For example, the UE (e.g., UE 110) transmits an RRC reestablishment request (e.g., message 502) to initiate an RRC connection-reestablishment procedure in response to detecting a failure in an RRC connection. As another example the UE (e.g., UE 110) transmits an RRC resume request (e.g., message 804) to initiate an RRC connection resume procedure in response to receiving an RRC release message.

At 1010, the UE receives, in response to the transmitting the RRC request, an RRC setup message from the network. For example, the UE (e.g., UE 110) receives the RRC setup message (e.g., message 504) in scenarios where the network is unable to provide an RRC reestablishment. As another example, the UE (e.g., UE 110) receives the RRC setup message (e.g., message 806) from a second base station of the network, such as in scenarios where a first base station of the network is unable to provide the RRC resume as requested by the UE.

At 1015, the UE communicates, from an RRC protocol layer at the UE to a 5GMM (fifth-generation mobility-management) protocol layer at the UE, an indication of a fallback. For example, an RRC protocol layer at the UE (e.g., UE RRC layer 406) communicates the indication of the fallback (e.g., indication 508) to the 5GMM protocol layer (e.g., UE 5GMM layer 404).

At 1020, the UE transitions the 5GMM protocol layer to a 5GMM-idle state. For example, a 5GMM protocol layer at the UE (e.g., UE 5GMM layer 404) transitions to an idle state (e.g., at 512 of FIGS. 5 and 8). Alternately or additionally, the 5GMM protocol layer starts a timer, such as a T3512 timer, in response to receiving the indication.

At 1025, the UE communicates, from the RRC protocol layer to the 5GMM protocol layer, an RRC connection established indication. For example, the RRC protocol layer at the UE (e.g., UE RRC layer 406) communicates an RRC connection established (radio-resource-control connection-established) indication (e.g., indication 510) to the 5GMM protocol layer at the UE (e.g., UE 5GMM layer 404). Alternately or additionally, the RRC protocol layer communicates an RRC setup complete (radio-resource-control setup-complete) message to the network, where the RRC setup complete message includes a 5GMM message (e.g., message 506) or a 5GMM NAS message (e.g., message 808) generated by the 5GMM protocol layer.

At 1030, the UE transitions the 5GMM protocol layer to a 5GMM-connected state. For example, the 5GMM protocol layer at the UE (e.g., UE 5GMM layer 404) transitions to a 5GMM-connected state to enable data transmission and reception with the network. In some implementations, the 5GMM protocol layer at the UE (e.g., UE 5GMM layer 404) stops the timer started at 1020.

Figure 11:
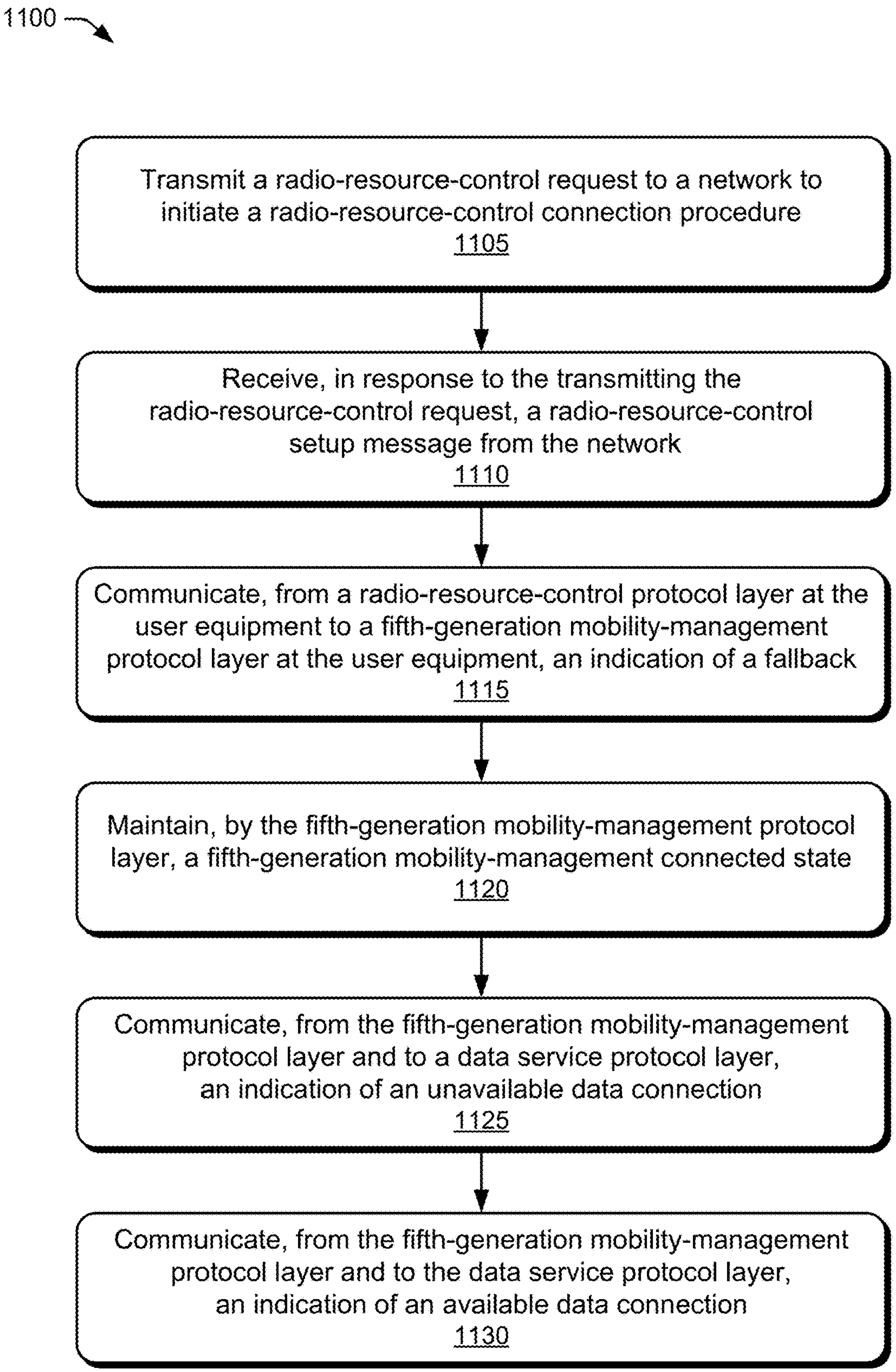
FIG. 11 illustrates an example method for handling mobility management state transitions after fallback to RRC establishment.

FIG. 11 illustrates an example method 1100 for handling mobility management state transitions after fallback to RRC establishment. In some implementations, operations of method 1100 are performed by a user equipment, such as UE 110 of FIG. 1.

At 1105, the UE transmits an RRC (radio-resource-control) request to a network to initiate an RRC connection procedure. For example, the UE (e.g., UE 110) transmits an RRC reestablishment request (e.g., message 502) to initiate an RRC connection reestablishment procedure in response to detecting a failure in an RRC connection. As another example the UE (e.g., UE 110) transmits an RRC resume request (e.g., message 804) to initiate an RRC connection resume procedure in response to receiving an RRC release message.

At 1110, the UE receives, in response to the transmitting the RRC request, an RRC setup message from the network. For example, the UE (e.g., UE 110) receives the RRC setup message (e.g., message 504) in scenarios where the network is unable to provide an RRC reestablishment. As another example, the UE (e.g., UE 110) receives the RRC setup message (e.g., message 806) from a second base station of the network, such as in scenarios where a first base station of the network is unable to provide the RRC resume as requested by the UE.

At 1115, the UE communicates, from an RRC (radio-resource-control) protocol layer at the user equipment to a 5GMM (fifth-generation mobility-management) protocol layer at the UE, an indication of the fallback based on the reception of the RRC setup message. For example, an RRC protocol layer at the UE (e.g., UE RRC layer 406) communicates the indication of the fallback (e.g., indication 508) to the 5GMM protocol layer (e.g., UE 5GMM layer 404).

At 1120, the UE maintains, by the 5GMM protocol layer, a 5GMM-connected state in response to receiving the indication of the fallback. For example, the 5GMM protocol layer (e.g., UE 5GMM layer 404) maintains a connected state. Alternately or additionally, the 5GMM protocol layer (e.g., UE 5GMM layer 404) transitions to the 5GMM-connected state from a 5GMM-connected-with-RRC-inactive-indication state as described with reference to FIG. 9.

At 1125, the UE communicates, from the 5GMM protocol layer and to a data service protocol layer, an indication of an unavailable data connection. For example, the 5GMM protocol layer (e.g., UE 5GMM layer 404) communicates the indication (e.g., indication 516) to the data service protocol layer at the UE (e.g., UE data service layer 402) to stop data transmission and reception with the network. In implementations, the 5GMM protocol layer communicates the indication of the unavailable data connection in response to receiving the indication of the fallback.

At 1130, the UE communicates, from the 5GMM protocol layer and to the data service protocol layer, an indication of an available data connection. For example, the 5GMM protocol layer (e.g., UE 5GMM layer 404) communicates the indication (e.g., indication 530) to the data service protocol layer at the UE (e.g., UE data service layer 402) to enable the data transmission and reception with the network. In implementations, the 5GMM protocol layer communicates the indication of the available data connection in response to receiving an indication that user-plane resources have been established (e.g., indication 528).

Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Although techniques and devices for handling mobility management state transitions after fallback to RRC establishment have been described in language specific to features and/or methods, it is to be understood that the subject of the appended claims is not necessarily limited to the specific features or methods described. Rather, the specific features and methods are disclosed as example implementations of handling mobility management state transitions after fallback to RRC establishment.

In the following, several examples are described.

Example 1: A method performed by a user equipment for handling a mobility management state transition after fallback to a radio-resource-control establishment, the method comprising: transmitting a radio-resource-control request to a network to initiate a radio-resource-control connection procedure; receiving, in response to the transmitting the radio-resource-control request, a radio-resource-control setup message from the network; communicating, from a radio-resource-control protocol layer at the user equipment to a fifth-generation mobility-management protocol layer at the user equipment, an indication of the fallback based on the receiving; transitioning the fifth-generation mobility-management protocol layer to a fifth-generation mobility-management idle state; communicating, from the radio-resource-control protocol layer to the fifth-generation mobility-management protocol layer, a radio-resource-control connection-established indication; and transitioning the fifth-generation mobility-management protocol layer to a fifth-generation mobility-management connected state to enable data transmission and reception with the network.

Example 2: The method of example 1, further comprising: starting, by the fifth-generation mobility-management protocol layer, a timer in response to receiving the indication of the fallback; and stopping, by the fifth-generation mobility-management protocol layer, the timer in response to receiving the radio-resource-control connection-established indication.

Example 3: The method of example 1 or example 2, further comprising: receiving a radio-resource-control reconfiguration message from the network; configuring a data radio bearer based on the radio-resource-control reconfiguration message; and communicating, from the radio-resource-control protocol layer to the fifth-generation mobility-management protocol layer, an indication that user-plane resources have been established.

Example 4: The method of example 3, further comprising: communicating, from the fifth-generation mobility-management protocol layer to a data service protocol layer, an indication of an unavailable data connection in response to receiving the indication of the fallback to stop the data transmission and reception; and communicating, from the fifth-generation mobility-management protocol layer to the data service protocol layer, an indication of an available data connection in response to the indication that the user-plane resources have been established to enable the data transmission and reception.

Example 5: The method in any one of examples 1 to 4, wherein the radio-resource-control connection procedure is a radio-resource-control connection-reestablishment procedure, and the radio-resource-control request comprises a radio-resource-control reestablishment request.

Example 6: The method of example 5, further comprising: transmitting, in response to the receiving the radio-resource-control setup message, a radio-resource-control setup-complete message to the network, wherein the radio-resource-control setup-complete message includes a fifth-generation mobility-management message generated by the fifth-generation mobility-management protocol layer, wherein the fifth-generation mobility-management message comprises: a service request; or a registration request.

Example 7: The method of example 6, further comprising: receiving, by the fifth-generation mobility-management protocol layer, an indication of a failure in a radio-resource-control connection from the radio-resource-control protocol layer; and generating, by the fifth-generation mobility-management protocol layer, the fifth-generation mobility-management message in response to receiving the indication of the failure in the radio-resource-control connection.

Example 8: The method of example 6, further comprising: generating, by the fifth-generation mobility-management protocol layer, the fifth-generation mobility-management message in response to receiving the indication of the fallback.

Example 9: The method of example 6, further comprising: generating, by the fifth-generation mobility-management protocol layer, the fifth-generation mobility-management message in response to receiving the radio-resource-control connection-established indication.

Example 10: The method in any one of examples 1 to 4, wherein the radio-resource-control connection procedure is a radio-resource-control connection-resume procedure, and the radio-resource-control request comprises a radio-resource-control resume request.

Example 11: The method of example 10, further comprising: transitioning, in response to receiving the radio-resource-control setup message, the radio-resource-control protocol layer to a radio-resource-control connected state.

Example 12: The method of example 10 or example 11, further comprising: transmitting, in response to the receiving the radio-resource-control setup message, a radio-resource-control setup-complete message to the network, wherein the radio-resource-control setup-complete message includes a fifth-generation mobility-management non-stratum-access message generated by the fifth-generation mobility-management protocol layer, wherein the fifth-generation mobility-management non-stratum-access message comprises: a service request; or a registration request.

Example 13: The method of example 12, further comprising: generating, by the fifth-generation mobility-management protocol layer, the fifth-generation mobility-management non-stratum-access message in response to receiving the indication of the fallback.

Example 14: The method of example 12, further comprising: generating, by the fifth-generation mobility-management protocol layer, the fifth-generation mobility-management non-stratum-access message in response to receiving the radio-resource-control connection-established indication.

Example 15: A user equipment comprising: a wireless transceiver; and a processor and memory system coupled to the wireless transceiver and configured to direct the user equipment to perform any one of the examples 1 to 14.

Example 16: A method performed by a user equipment for handling a fallback to a radio-resource-control establishment, the method comprising: transmitting a radio-resource-control request to a network to initiate a radio-resource-control connection procedure; receiving, in response to the transmitting the radio-resource-control request, a radio-resource-control setup message from the network; communicating, from a radio-resource-control protocol layer at the user equipment to a fifth-generation mobility-management protocol layer at the user equipment, an indication of the fallback based on the receiving; maintaining, by the fifth-generation mobility-management protocol layer, a fifth-generation mobility-management connected state in response to receiving the indication of the fallback; communicating, from the fifth-generation mobility-management protocol layer and to a data service protocol layer at the user equipment, an indication of an unavailable data connection in response to receiving the indication of the fallback to stop data transmission and reception with the network; and communicating, from the fifth-generation mobility-management protocol layer and to the data service protocol layer, an indication of an available data connection to enable the data transmission and reception with the network, the communicating the indication of the available data connection being in response to receiving an indication that user-plane resources have been established.

Example 17: The method as recited in example 16, further comprising: receiving a radio-resource-control reconfiguration message from the network; configuring a data radio bearer based on the radio-resource-control reconfiguration message; and communicating, from the radio-resource-control protocol layer to the fifth-generation mobility-management protocol layer, the indication that user-plane resources have been established.

Example 18: The method in example 16 or example 17, wherein the radio-resource-control connection procedure is a radio-resource-control connection-reestablishment procedure, and the radio-resource-control request comprises a radio-resource-control reestablishment request.

Example 19: The method of example 18, further comprising: transmitting, in response to the receiving the radio-resource-control setup message, a radio-resource-control setup-complete message to the network, wherein the radio-resource-control setup-complete message includes a fifth-generation mobility-management message generated by the fifth-generation mobility-management protocol layer, wherein the fifth-generation mobility-management message comprises: a service request; or a registration request.

Example 20: The method of example 19, further comprising: receiving, by the fifth-generation mobility-management protocol layer, an indication of a failure in a radio-resource-control connection from the radio-resource-control protocol layer; and generating, by the fifth-generation mobility-management protocol layer, the fifth-generation mobility-management message in response to receiving the indication of the failure in the radio-resource-control connection.

Example 21: The method of example 19, further comprising: generating, by the fifth-generation mobility-management protocol layer, the fifth-generation mobility-management message in response to receiving the indication of the fallback.

Example 22: The method of example 19, further comprising: receiving, by the fifth-generation mobility-management protocol layer and from the radio-resource-control protocol layer, a radio-resource-control connection-established indication; and generating, by the fifth-generation mobility-management protocol layer, the fifth-generation mobility-management message in response to receiving the radio-resource-control connection-established indication.

Example 23: The method in example 16 or example 17, wherein the radio-resource-control connection procedure is a radio-resource-control connection-resume procedure, and the radio-resource-control request comprises a radio-resource-control resume request.

Example 24: The method of example 23, further comprising: transitioning, in response to receiving the radio-resource-control setup message, the radio-resource-control protocol layer to a radio-resource-control connected state.

Example 25: The method of example 23 or example 24, further comprising: transmitting, in response to the receiving the radio-resource-control setup message, a radio-resource-control setup-complete message to the network, wherein the radio-resource-control setup-complete message includes a fifth-generation mobility-management non-stratum-access message generated by the fifth-generation mobility-management protocol layer, wherein the fifth-generation mobility-management non-stratum-access message comprises: a service request; or a registration request.

Example 26: The method of example 25, further comprising: generating, by the fifth-generation mobility-management protocol layer, the fifth-generation mobility-management non-stratum-access message in response to receiving the indication of the fallback.

Example 27: The method of example 26, further comprising: receiving, by the fifth-generation mobility-management protocol layer and from the radio-resource-control protocol layer, a radio-resource-control connection-established indication; and generating, by the fifth-generation mobility-management protocol layer, the fifth-generation mobility-management non-stratum-access message in response to receiving the radio-resource-control connection-established indication.

What is claimed is:

1. A method performed by a user equipment for handling a mobility management state transition after fallback to a radio-resource-control establishment, the method comprising:

transmitting a radio-resource-control request to a network to initiate a radio-resource-control connection procedure while operating in a mobility-management connected state;

receiving, in response to the transmitting the radio-resource-control request, a radio-resource-control setup message from the network;

based on the receiving of the radio-resource-control setup message from the network, communicating, from a radio-resource-control protocol layer at the user equipment to a mobility-management protocol layer at the user equipment, an indication of the fallback; and transmitting, in response to the receiving the radio-resource-control setup message, a radio-resource-control setup-complete message to the network, the radio-resource-control setup-complete message including a mobility-management message generated by the mobility-management protocol layer, the mobility-management message comprising:

a service request; or a registration request.

2. The method of claim 1, further comprising:

receiving a radio-resource-control reconfiguration message from the network;

configuring a data radio bearer based on the radio-resource-control reconfiguration message; and communicating, from the radio-resource-control protocol layer to the mobility-management protocol layer, an indication that user-plane resources have been established.

3. The method of claim 2, further comprising:

communicating, from the mobility-management protocol layer to a data service protocol layer, an indication of an unavailable data connection in response to receiving the indication of the fallback; and communicating, from the mobility-management protocol layer to the data service protocol layer, an indication of an available data connection in response to the indication that the user-plane resources have been established.

4. The method in claim 1, wherein the radio-resource-control connection procedure is a radio-resource-control connection-reestablishment procedure, and the radio-resource-control request comprises a radio-resource-control reestablishment request.

5. The method of claim 1, further comprising:

receiving, by the mobility-management protocol layer, an indication of a failure in a radio-resource-control connection from the radio-resource-control protocol layer; and generating, by the mobility-management protocol layer, the mobility-management message in response to receiving the indication of the failure in the radio-resource-control connection.

6. The method of claim 1, further comprising:

generating, by the mobility-management protocol layer, the mobility-management message in response to receiving the indication of the fallback.

7. The method in claim 1, wherein the radio-resource-control connection procedure is a radio-resource-control connection-resume procedure, and the radio-resource-control request comprises a radio-resource-control resume request.

8. The method of claim 7, further comprising:

transitioning, in response to receiving the radio-resource-control setup message, the radio-resource-control protocol layer to a radio-resource-control connected state.

9. The method of claim 1, further comprising:

based on the communicating the indication of the fallback, transitioning the mobility-management protocol layer to a mobility-management idle state; and transitioning the mobility-management protocol layer to a mobility-management connected state.

10. The method of claim 9, further comprising:

communicating, from the radio-resource-control protocol layer to the mobility-management protocol layer, a radio-resource-control connection-established indication.

11. The method of claim 10, further comprising:

starting, by the mobility-management protocol layer, a timer in response to receiving the indication of the fallback; and stopping, by the mobility-management protocol layer, the timer in response to receiving the radio-resource-control connection-established indication.

12. The method of claim 1, further comprising:

based on the communicating the indication of the fallback at the mobility-management protocol layer, remaining in the mobility-management connected state.

13. A user equipment comprising:

a wireless transceiver; and a processor and memory system coupled to the wireless transceiver, the memory system comprising processor-executable instructions that, responsive to execution by the processor, direct the user equipment to perform operations for handling a mobility management state transition after fallback to a radio-resource-control establishment, the operations comprising:

transmitting a radio-resource-control request to a network to initiate a radio-resource-control connection procedure while operating in a mobility-management connected state;

receiving, in response to the transmitting the radio-resource-control request, a radio-resource-control setup message from the network;

based on the receiving of the radio-resource-control setup message from the network, communicating, from a radio-resource-control protocol layer at the user equipment to a mobility-management protocol layer at the user equipment, an indication of the fallback; and transmitting, in response to the receiving the radio-resource-control setup message, a radio-resource-control setup-complete message to the network, the radio-resource-control setup-complete message including a mobility-management message generated by the mobility-management protocol layer, the mobility-management message comprising:

a service request; or a registration request.

14. The user equipment of claim 13, the memory system comprising processor-executable instructions that direct the user equipment to perform further operations comprising:

receiving a radio-resource-control reconfiguration message from the network;

configuring a data radio bearer based on the radio-resource-control reconfiguration message; and communicating, from the radio-resource-control protocol layer to the mobility-management protocol layer, an indication that user-plane resources have been established.

15. The user equipment of claim 13, wherein the radio-resource-control connection procedure is a radio-resource-control connection-reestablishment procedure, and the radio-resource-control request comprises a radio-resource-control reestablishment request.

16. The user equipment of claim 13, wherein the radio-resource-control connection procedure is a radio-resource-control connection-resume procedure, the radio-resource-control request comprises a radio-resource-control resume request, and wherein the memory system comprising processor-executable instructions that direct the user equipment to perform further operations comprising:

transitioning, in response to receiving the radio-resource-control setup message, the radio-resource-control protocol layer to a radio-resource-control connected state.

17. The user equipment of claim 13, the memory system comprising processor-executable instructions that direct the user equipment to perform further operations comprising:

based on the communicating the indication of the fallback at the mobility-management protocol layer, transitioning the mobility-management protocol layer to a mobility-management idle state; and transitioning the mobility-management protocol layer to a mobility-management connected state.

18. The user equipment of claim 17, the memory system comprising processor-executable instructions that direct the user equipment to perform further operations comprising:

communicating, from the radio-resource-control protocol layer to the mobility-management protocol layer, a radio-resource-control connection-established indication.

19. The user equipment of claim 18, the memory system comprising processor-executable instructions that direct the user equipment to perform further operations comprising:

starting, by the mobility-management protocol layer, a timer in response to receiving the indication of the fallback; and stopping, by the mobility-management protocol layer, the timer in response to receiving the radio-resource-control connection-established indication.

20. The user equipment of claim 13, further comprising:

based on the communicating the indication of the fallback at the mobility-management protocol layer, remaining in the mobility-management connected state.

* * * * *